(12) United States Patent
Morita et al.

(10) Patent No.: US 9,620,794 B2
(45) Date of Patent: Apr. 11, 2017

(54) FUEL CELL SYSTEM AND METHOD OF OPERATING THE SAME

(71) Applicant: PANASONIC CORPORATION, Osaka (JP)

(72) Inventors: Junji Morita, Kyoto (JP); Hiroshi Tatsui, Shiga (JP); Akinori Yukimasa, Osaka (JP); Hidetoshi Wakamatsu, Shiga (JP); Atsutaka Inoue, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 406 days.

(21) Appl. No.: 14/382,733

(22) PCT Filed: Apr. 4, 2013

(86) PCT No.: PCT/JP2013/002345
§ 371 (c)(1),
(2) Date: Sep. 3, 2014

(87) PCT Pub. No.: WO2013/153789
PCT Pub. Date: Oct. 17, 2013

(65) Prior Publication Data
US 2015/0044585 A1 Feb. 12, 2015

(30) Foreign Application Priority Data
Apr. 10, 2012 (JP) ................. 2012-088971

(51) Int. Cl.
*H01M 8/04* (2016.01)
*H01M 8/04014* (2016.01)
(Continued)

(52) U.S. Cl.
CPC ... *H01M 8/04022* (2013.01); *H01M 8/04014* (2013.01); *H01M 8/04029* (2013.01);
(Continued)

(58) Field of Classification Search
CPC ......... H01M 8/04022; H01M 8/04373; H01M 8/04776; H01M 8/0432; H01M 8/04253
(Continued)

(56) References Cited

U.S. PATENT DOCUMENTS 6,451,465 B1 * 9/2002 Chalfant ............. B60L 11/1894
429/416
2004/0106026 A1 6/2004 Fujita et al.
(Continued)

FOREIGN PATENT DOCUMENTS

JP 2003-208915 A 7/2003
JP 2004-192889 A 7/2004
(Continued)

OTHER PUBLICATIONS

International Search Report issued in PCT/JP2013/002345, dated Jul. 2, 2013, with English translation.

*Primary Examiner* — Basia Ridley
*Assistant Examiner* — James Erwin
(74) *Attorney, Agent, or Firm* — McDermott Will & Emery LLP

(57) ABSTRACT

A fuel cell system includes: a fuel cell to generate electric power; a casing accommodating at least the fuel cell, the casing including an air inlet and an exhaust outlet; a supply passage connected to the air inlet, to introduce external air into the casing; an exhaust passage connected to the exhaust outlet, to exchange heat with the supply passage and discharge at least air inside the casing; an air supply device to introduce the external air into the casing; a temperature detector to detect a temperature; and a controller configured to control at least the air supply device. If the temperature detected by the temperature detector after the controller has caused the air supply device to operate is lower than or equal to a first predetermined temperature, the controller reduces (Continued)

an amount of air supplied by the air supply device and causes the air supply device to continue operating.

9 Claims, 12 Drawing Sheets

(51) Int. Cl.
    *H01M 8/0432*     (2016.01)
    *H01M 8/04029*     (2016.01)
    *H01M 8/04746*     (2016.01)
    *H01M 8/0612*     (2016.01)
    *H01M 8/2475*     (2016.01)
    *H01M 8/04223*     (2016.01)

(52) U.S. Cl.
    CPC ..... *H01M 8/0432* (2013.01); *H01M 8/04373* (2013.01); *H01M 8/04776* (2013.01); *H01M 8/0618* (2013.01); *H01M 8/04253* (2013.01); *H01M 8/2475* (2013.01); *H01M 2250/10* (2013.01); *Y02B 90/14* (2013.01)

(58) Field of Classification Search
    USPC .......................................................... 429/423
    See application file for complete search history.

(56) References Cited

U.S. PATENT DOCUMENTS

| | | |
|---|---|---|
| 2006/0063049 A1 | 3/2006 | Fujita |
| 2008/0075992 A1 | 3/2008 | Fujita et al. |
| 2008/0124594 A1* | 5/2008 | Kim ................. H01M 8/04022 429/412 |

FOREIGN PATENT DOCUMENTS

| | | |
|---|---|---|
| JP | 2006-073446 A | 3/2006 |
| JP | 2006-253020 A | 9/2006 |
| JP | 2008-108449 A | 5/2008 |
| JP | 2008-210631 A | 9/2008 |
| JP | 2009-238390 A | 10/2009 |
| JP | 2009-266613 A | 11/2009 |
| JP | 2010-086916 A | 4/2010 |
| JP | 2010-257580 A | 11/2010 |

* cited by examiner

FUEL CELL SYSTEM AND METHOD OF OPERATING THE SAME

RELATED APPLICATIONS

This application is the U.S. National Phase under 35 U.S.C. §371 of International Application No. PCT/JP2013/002345, filed on Apr. 4, 2013, which in turn claims the benefit of Japanese Application No. 2012-088971, filed on Apr. 10, 2012, the disclosures of which Applications are incorporated by reference herein.

TECHNICAL FIELD

The present invention relates to a fuel cell system configured to supply heat and electricity and a method of operating the same.

BACKGROUND ART

A fuel cell system is a power generation system configured to generate and supply electric power to a consumer, thereby covering the consumer's electricity load.

There is a known fuel cell power generation system that is configured such that a fuel cell system as mentioned above is installed inside a building and that is intended to improve the exhaust performance of the fuel cell system (see Patent Literature 1, for example). The fuel cell system disclosed in Patent Literature 1 is a fuel cell system installed and used inside a building provided with an air inlet. The fuel cell system includes: an air introduction port, through which the air inside the building is introduced into the fuel cell system; an air exhaust pipe, through which the air inside the fuel cell system is discharged to the outside of the building; and a ventilator. The ventilator guides the air outside the building into the building through the air inlet, such that the air is further introduced into the fuel cell system through the air introduction port, and such that the air is then discharged to the outside of the building through the air exhaust pipe.

There is also a known fuel cell system that is installed inside a building and that includes a vertically-extending duct for the purpose of improving the performance of discharging an exhaust gas generated by the fuel cell system (see Patent Literature 2, for example). In the fuel cell system disclosed in Patent Literature 2, the duct extends vertically inside the building, and the top end of the duct is positioned outside the building. The duct has a double-pipe structure. A ventilation pipe and an exhaust pipe are connected to the duct, such that each of the exhaust gas and air separately flows through a corresponding one of the inner side and the outer side of the duct.

Further, there is a known fuel cell system configured to prevent freezing of water generated inside a fuel cell (see Patent Literature 3, for example). The fuel cell system disclosed in Patent Literature 3 is configured to cause heat exchange between exhaust air discharged from the fuel cell and supply air supplied to the fuel cell, the supply air being external air, such that the supply air is warmed up through the heat exchange, thereby preventing the freezing.

CITATION LIST

Patent Literature

PTL 1: Japanese Laid-Open Patent Application Publication No. 2006-73446

PTL 2: Japanese Laid-Open Patent Application Publication No. 2008-210631

PTL 3: Japanese Laid-Open Patent Application Publication No. 2009-238390

SUMMARY OF INVENTION

Technical Problem

In view of the fuel cell systems disclosed in Patent Literatures 1 and 2, it is conceivable to adopt such a configuration as follows. Specifically, a fuel cell system installed inside a building includes a duct that includes: an air supply passage, through which the air outside the building is introduced into the fuel cell system; and an exhaust passage, through which an exhaust gas generated by the fuel cell system is discharged to the outside of the building. An air inlet and an exhaust outlet of the fuel cell system are connected to the air supply passage and the exhaust passage of the duct, respectively.

If the fuel cell system thus configured and installed inside the building is operated when the outside temperature is a sub-zero temperature, then the cold sub-zero external air is supplied into the fuel cell system. Accordingly, there is a risk that water generated in the fuel cell and the like become frozen, which may result in hindering the operation of the fuel cell system. In the case of adopting such a fuel cell system configuration as disclosed in Patent Literature 3, if, for example, the fuel cell system starts operating from a stopped state when the outside temperature is a sub-zero temperature, then since the temperature of the exhaust air discharged from the fuel cell has not sufficiently increased yet, the supply air is not warmed up, which may cause freezing in the fuel cell.

While the fuel cell system is in operation, the inside of the casing of the fuel cell system is supplied with external air, and is thereby ventilated. While the fuel cell system is operating stably, the inside of the casing is sufficiently warmed up by internal heat that is generated when accessory devices operate. Therefore, the ventilation does not cause problems relating to temperature drop inside the casing. However, immediately after the fuel cell system is started, there is no internal heat generated inside the fuel cell system since the accessory devices have just started operating. As a result, external air for use in ventilation causes transient temperature drop inside the casing. At the time, if the temperature of the external air is a sub-zero temperature, then, for example, cooling water of the fuel cell, water in an exhaust heat recovery passage, or condensation water that has built up in fuel gas piping and/or off gas piping during the stop of the fuel cell system freeze up. This causes abnormality in fluid supply and/or causes damage, which may render the fuel cell system unable to perform start-up.

As described above, conventional fuel cell systems fail to take sufficient measures against freezing that occurs when a fuel cell system performs start-up under the condition that the outside temperature is a sub-zero temperature.

Moreover, in the case of a fuel cell system installed inside a building, it is possible that the temperature inside the casing of the fuel cell system is different from the temperature outside the building. Therefore, even if the temperature inside the casing of the fuel cell system is detected and a freezing prevention device is operated accordingly, there is still a case where the transient freezing that occurs at the time of start-up cannot be prevented.

The present invention solves the above-described conventional problems. An object of the present invention is to provide a fuel cell system capable of avoiding freezing that is caused by temperature drop inside the casing even if the outside temperature when the fuel cell system starts operating is low.

Solution to Problem

In order to solve the above-described conventional problems, a fuel cell system according to the present invention includes: a fuel cell configured to generate electric power by causing a fuel gas and an oxidizing gas to react with each other; a casing accommodating at least the fuel cell, the casing including an air inlet and an exhaust outlet formed therein; a supply passage connected to the air inlet, the supply passage being configured to introduce external air into the casing from outside of the casing; an exhaust passage connected to the exhaust outlet, the exhaust passage being configured to exchange heat with the supply passage and discharge at least air inside the casing to the outside of the casing; an air supply device configured to introduce the external air into the casing through the supply passage; a temperature detector disposed such that at least one of the inside of the casing, the supply passage, and the exhaust passage is provided with the temperature detector, the temperature detector being configured to detect a temperature; and a controller configured to control at least the air supply device. If the temperature detected by the temperature detector after the controller has caused the air supply device to operate is lower than or equal to a first predetermined temperature, the controller reduces an amount of air supplied by the air supply device and causes the air supply device to continue operating. Accordingly, when the system is started, the external air is introduced into the casing through the supply passage, and if the temperature of the introduced external air is low, the amount of air supplied into the casing is reduced, and thereby the temperature inside the casing increases. In this manner, freezing in the fuel cell system can be avoided. In addition, since the supply passage and the exhaust passage are configured to exchange heat with each other, the air discharged to the outside of the casing through the exhaust passage causes the temperature of the external air introduced into the casing to increase.

Advantageous Effects of Invention

The present invention makes it possible to provide a fuel cell system capable of avoiding freezing that is caused by temperature drop inside the casing even if the outside temperature when the fuel cell system starts operating is low.

DESCRIPTION OF EMBODIMENTS

Figure 1:
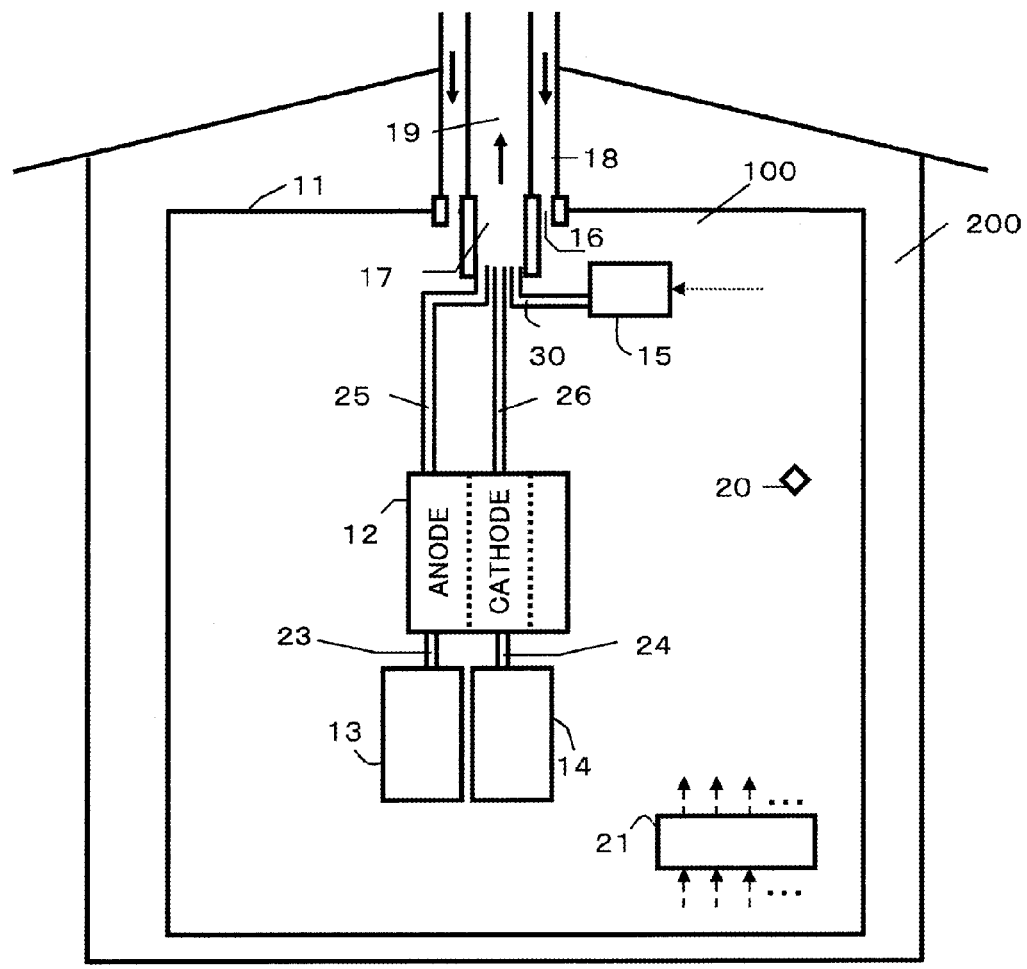
FIG. 1 is a schematic diagram showing a schematic configuration of a fuel cell system according to Embodiment 1 of the present invention.

In a first aspect of the present invention, a fuel cell system includes: a fuel cell configured to generate electric power by causing a fuel gas and an oxidizing gas to react with each other; a casing accommodating at least the fuel cell, the casing including an air inlet and an exhaust outlet formed therein; a supply passage connected to the air inlet, the supply passage being configured to introduce external air into the casing from outside of the casing; an exhaust passage connected to the exhaust outlet, the exhaust passage being configured to exchange heat with the supply passage and discharge at least air inside the casing to the outside of the casing; an air supply device configured to introduce the external air into the casing through the supply passage; a temperature detector disposed such that at least one of the inside of the casing, the supply passage, and the exhaust passage is provided with the temperature detector, the temperature detector being configured to detect a temperature; and a controller configured to control at least the air supply device. If the temperature detected by the temperature detector after the controller has caused the air supply device to operate is lower than or equal to a first predetermined temperature, the controller reduces an amount of air supplied by the air supply device and causes the air supply device to continue operating.

According to the above-described configuration, when the system is started, the air supply device introduces the external air into the casing through the supply passage, and if the temperature of the introduced external air is low, the amount of air supplied into the casing is reduced, and thereby the temperature inside the casing increases. In this manner, freezing in the fuel cell system can be avoided. It should be noted that, the definition of the wording, "causes the air supply device to continue operating", includes both causing the air supply device to operate continuously and causing the air supply device to operate and stop alternately, i.e., to operate intermittently.

In addition, since the supply passage and the exhaust passage are configured to exchange heat with each other, the air discharged to the outside of the casing through the exhaust passage causes the temperature of the external air introduced into the casing to increase. Desirably, the supply passage (piping) is formed outside the exhaust passage (piping), and the supply passage and the exhaust passage are concentric passages, forming a double-pipe structure. Accordingly, the area of contact between these passages is large, which allows highly efficient heat exchange. For example, in a case where the temperature of the external air is zero degree, although it is necessary to reduce the output of the air supply device due to the risk of freezing, the zero-degree external air, which is introduced into the casing, is warmed up in the supply passage and then enters the casing. By the time the introduced external air enters the casing, the temperature of the introduced air can be increased to such a temperature at which freeze prevention control is unnecessary (e.g., increased to 2 to 3 degrees Celsius).

A fuel cell system according to a second aspect of the present invention is configured such that, in the fuel cell system according to the first aspect, the temperature detector is disposed inside the casing. If the temperature detected by the temperature detector after the controller has caused the air supply device to operate and the external air has been introduced into the casing through the supply passage is lower than or equal to the first predetermined temperature, the controller reduces the amount of air supplied by the air supply device and causes the air supply device to continue operating.

According to the above-described configuration, the temperature detector is disposed inside the casing. This makes it possible to assuredly detect the temperature of the external air introduced into the casing.

A fuel cell system according to a third aspect of the present invention is configured such that, in the fuel cell system according to the first or second aspect, if the temperature detected by the temperature detector after the controller has caused the air supply device to operate for a first predetermined time is lower than or equal to the first predetermined temperature, the controller reduces the amount of air supplied by the air supply device and causes the air supply device to continue operating.

According to the above-described configuration, after the system is started, the external air introduced into the casing is sufficiently warmed up by heat exchange. In this manner, a high freeze suppressing effect is provided. The first predetermined time herein is a time that is necessary, after the fuel cell system is started, for the temperature detected by the temperature detector to become constant. The first predetermined time may be set in advance through a simulation, experiment, or the like.

A fuel cell system according to a fourth aspect of the present invention is configured such that, in the fuel cell system according to the first or second aspect, if the temperature detected by the temperature detector after the controller has caused the air supply device to operate for a second predetermined time is in a predetermined temperature range and lower than or equal to the first predetermined temperature, the controller reduces the amount of air supplied by the air supply device and causes the air supply device to continue operating.

According to the above-described configuration, after the system is started, the external air introduced into the casing is sufficiently warmed up by heat exchange, and the temperature of the introduced external air is stabilized. As a result, the freeze suppressing effect is improved.

A fuel cell system according to a fifth aspect of the present invention is configured such that, the fuel cell system according to any one of the first to fourth aspects further includes: a reformer configured to generate the fuel gas by reforming a raw material, and supply the fuel gas to the fuel cell; and a combustor configured to combust a combustible gas to heat the reformer. The air supply device includes at least one of a ventilator configured to ventilate the air inside the casing, an oxidizing gas supply device configured to supply air serving as the oxidizing gas to the fuel cell, and a combustion air supply device configured to supply combustion air to the combustor.

According to the above-described configuration, the amount of air supplied into the casing can be reduced by utilizing the devices used in the fuel cell system.

A fuel cell system according to a sixth aspect of the present invention is configured such that, in the fuel cell system according to the fifth aspect, the air supply device includes the ventilator configured to ventilate the air inside the casing and the combustion air supply device configured to supply combustion air to the combustor, the exhaust passage is in communication with the combustor in such a manner as to discharge a flue gas from the combustor, and if the temperature detected by the temperature detector after the controller has caused the air supply device to operate is lower than or equal to a second predetermined temperature, which is lower than the first predetermined temperature, the controller stops the ventilator from operating, causes the combustion air supply device to operate, and causes the combustor to perform combustion.

According to the above-described configuration, in a case where the temperature of the introduced external air is low to a greater degree, the combustion air supply device is caused to operate, and the combustor is caused to perform combustion. As a result, in the heat exchange between the exhaust passage and the supply passage, the flue gas warms up the external air introduced into the casing. Since the ventilator merely discharges air from the inside of the casing, the temperature of the air that is discharged by the ventilator through the exhaust passage is low. Therefore, the flue gas, which is obtained as a result of operating the combustion air supply device, provides a better freeze suppressing effect in the fuel cell system than the exhaust gas sent from the ventilator. The freeze suppressing effect is particularly high in a case where the amount of air supplied by the ventilator is greater than the amount of air supplied by the combustion air supply device. Therefore, a configuration in which the amount of air supplied by the ventilator is greater than the amount of air supplied by the combustion air supply device is desirable.

A fuel cell system according to a seventh aspect of the present invention is configured such that, the fuel cell system according to any one of the first to sixth aspects further includes: at least one of a cooling water passage and a heat recovery passage, the cooling water passage being a passage through which cooling water circulates, the cooling water absorbing heat that is generated when the fuel cell generates electric power, the heat recovery passage being a passage through which heat recovery water circulates, the heat recovery water exchanging heat with an off fuel gas and an off oxidizing gas, the off fuel gas being the fuel gas that is discharged from the fuel cell, the off oxidizing gas being the oxidizing gas that is discharged from the fuel cell; and a water circulator disposed in the at least one of the cooling water passage and the heat recovery passage. If the temperature detected by the temperature detector after the controller has caused the air supply device to operate is lower than or equal to a third predetermined temperature, which is lower than the first predetermined temperature, the controller increases an amount of water circulated by the water circulator as compared to a case where the temperature detected by the temperature detector after the controller has caused the air supply device to operate is higher than the third predetermined temperature.

According to the above-described configuration, at the start-up of the system, the water circulator circulates water through the water passages, and then, the amount of water circulation is increased if the temperature of the introduced external air is low to a greater degree. As a result, the temperature of the water passages becomes uniform. This makes it possible to suppress freezing of part of the water passages, or suppress transient freezing.

A fuel cell system according to an eighth aspect of the present invention is configured such that, the fuel cell system according to any one of the first to seventh aspects further includes a heating device disposed inside the casing. If the temperature detected by the temperature detector after the controller has caused the air supply device to operate is lower than or equal to a fourth predetermined temperature, which is lower than the third predetermined temperature, the controller increases an amount of heating by the heating device as compared to a case where the temperature detected by the temperature detector after the controller has caused the air supply device to operate is higher than the fourth predetermined temperature.

According to the above-described configuration, since the heating device is disposed inside the casing, if the temperature of the introduced external air is low to a greater degree, freezing inside the casing can be suppressed by means of heat from the heating device.

A fuel cell system according to a ninth aspect of the present invention is configured such that, in the fuel cell system according to any one of the first to eighth aspects, if the temperature detected by the temperature detector after the controller has caused the air supply device to operate is lower than or equal to a fifth predetermined temperature, which is lower than the fourth predetermined temperature, the controller prohibits start-up of the fuel cell system, or stops the fuel cell system from operating.

According to the above-described configuration, if the temperature of the introduced external air is low to a greater degree, the system is stopped from operating so that the external air will not be taken into the casing. In this manner, further freezing can be avoided.

A fuel cell system operating method according to a tenth aspect of the present invention is a method of operating a fuel cell system, the fuel cell system including: a fuel cell configured to generate electric power by causing a fuel gas and an oxidizing gas to react with each other; a casing accommodating at least the fuel cell, the casing including an air inlet and an exhaust outlet formed therein; a supply passage connected to the air inlet, the supply passage being configured to introduce external air into the casing from outside of the casing; an exhaust passage connected to the exhaust outlet, the exhaust passage being configured to exchange heat with the supply passage and discharge at least air inside the casing to the outside of the casing; and an air supply device configured to introduce the external air into the casing through the supply passage. The method includes: determining, after having caused the air supply device to operate, whether or not at least one of a temperature inside the casing, a temperature of the supply passage, and a temperature of the exhaust passage is lower than or equal to a first predetermined temperature; and reducing an amount of air supplied by the air supply device and causing the air supply device to continue operating if at least one of the temperatures is lower than or equal to the first predetermined temperature.

Hereinafter, preferred embodiments of the present invention are described with reference to the drawings. In the drawings, the same or corresponding components are denoted by the same reference signs, and repeating the same descriptions is avoided. In the drawings, only the components necessary for describing the present invention are shown, and the other components are omitted. Further, the present invention is not limited to the embodiments described below.

Embodiment 1

First, the configuration of a fuel cell system according to Embodiment 1 of the present invention is described with reference to the drawings.

FIG. 1 is a schematic diagram showing a schematic configuration of the fuel cell system according to Embodiment 1 of the present invention.

As shown in FIG. 1, a fuel cell system 100 according to Embodiment 1 is installed inside a building 200. The fuel cell system 100 includes a casing 11. The casing 11 includes a fuel cell 12, a fuel gas supply device 13, an oxidizing gas supply device 14, an air supply device 15, a temperature detector 20, and a controller 21.

The side surface or the top surface of the casing 11 is provided with an air inlet 16 and an exhaust outlet 17, such that the air inlet 16 and the exhaust outlet 17 extend through the casing 11. In the present embodiment, the air inlet 16 and the exhaust outlet 17 are formed in the top surface of the casing 11. For example, the exhaust outlet 17 has a round opening, and the air inlet 16 has an annular opening formed outside the exhaust outlet 17.

A supply passage 18, through which external air is introduced from the outside of the building 200 into the casing 11, is connected to the casing 11. The upstream end (opening) of the supply passage 18 is open to the atmosphere at the outside of the building, and the downstream end (opening) of the supply passage 18 is connected to the air inlet 16. An exhaust passage 19, through which the gas inside the casing 11 (mainly air and combusted gas) is discharged to the outside of the casing 11, is connected to the casing 11. The upstream end (opening) of the exhaust passage 19 is connected to the exhaust outlet 17, and the downstream end (opening) of the exhaust passage 19 is open to the outside of the building 200. The supply passage 18 and the exhaust passage 19 are configured to exchange heat with each other. Specifically, the supply passage 18 and the exhaust passage 19 are configured such that gas flowing through the supply passage 18 and gas flowing through the exhaust passage 19 exchange heat with each other. According to this configuration, air discharged to the outside of the casing 11 through the exhaust passage 19 causes an increase in the temperature of the external air introduced into the casing 11. In Embodiment 1, a heat exchange mechanism is realized by a double-pipe structure in which the supply passage 18 (piping) is formed outside the exhaust passage 19 (piping), and the supply passage 18 and the exhaust passage 19 are concentric passages. Accordingly, the area of contact between these passages is large, which allows highly efficient heat exchange. For example, in a case where the temperature of the external air is zero degree, although it is necessary to reduce the output of the air supply device due to the risk of freezing, the zero-degree external air, which is introduced into the casing, is warmed up in the supply passage and then enters the casing. By the time the introduced external air enters the casing, the temperature of the introduced air can be increased to such a temperature at which freeze prevention control is unnecessary (e.g., increased to 2 to 3 degrees Celsius).

The supply passage herein may be configured in any form, so long as the supply passage is configured to introduce the external air into the casing from the outside of the casing.

Examples of the configuration of the supply passage include: a configuration where the supply passage is directly fixed to the air inlet of the casing; a configuration when the supply passage passes through the air inlet formed in the casing, and the end of the supply passage is open inside the casing; and a configuration where the supply passage passes through the air inlet formed in the casing, and if there are a combustor and an oxidizing gas supply device configured to feed air to the fuel cell, the end of the supply passage is directly connected to a combustion air supply device configured to feed air to the combustor.

Also, the exhaust passage herein may be configured in any form, so long as the exhaust passage is configured to discharge the gas and air inside the casing to the outside of the casing. Examples of the configuration of the exhaust passage include: a configuration where the exhaust passage is directly fixed to the exhaust outlet formed in the casing; a configuration where the exhaust passage passes through the exhaust outlet, and the end of the exhaust passage is open inside the casing; and a configuration where the exhaust passage passes through the exhaust outlet formed in the casing, and the end of the exhaust passage is directly connected to, for example, an off fuel gas passage through which an off fuel gas from the fuel cell is discharged, an off oxidizing gas passage through which an off oxidizing gas from the fuel cell is discharged, and a flue gas passage through which a flue gas from a combustor is discharged.

Although Embodiment 1 describes the double-pipe structure, in which the exhaust passage 19 is formed inside the supply passage 18, Embodiment 1 is not thus limited. As an alternative, the exhaust passage 19 formed as a single pipe and the supply passage 18 formed as a single pipe may be arranged separately from each other.

The fuel gas supply device 13 may be configured in any form, so long as the fuel gas supply device 13 is configured to supply a fuel gas (hydrogen gas) to the fuel cell 12 while adjusting the flow rate of the fuel gas. For example, the fuel gas supply device 13 may be constituted by a hydrogen generation apparatus, hydrogen canister, hydrogen storage alloy, or the like and a device configured to supply a hydrogen gas sent from a supply pump. The fuel gas supply device 13 is connected to the fuel cell 12 via a fuel gas supply passage 23.

The fuel gas supply device 13 in Embodiment 1 of the present invention is constituted by a hydrogen canister and a fuel gas supply pump.

The oxidizing gas supply device 14 may be configured in any form, so long as the oxidizing gas supply device 14 is configured to supply an oxidizing gas (e.g., air) to the fuel cell 12 while adjusting the flow rate of the oxidizing gas. For example, the oxidizing gas supply device 14 may be configured as a blower, a diaphragm pump, or the like. The oxidizing gas supply device 14 is connected to the fuel cell 12 via an oxidizing gas supply passage 24.

The fuel cell 12 includes an anode and a cathode. In the fuel cell 12, the fuel gas that is supplied to the anode and the oxidizing gas that is supplied to the cathode react with each other. As a result, electric power and heat are generated. Various types of fuel cells, such as a polymer electrolyte fuel cell or a solid oxide fuel cell, may be used as the fuel cell 12 in Embodiment 1. Since the fuel cell 12 is configured in the same manner as a general fuel cell, a detailed description of the configuration of the fuel cell 12 is omitted.

The electric power generated by the fuel cell 12 is supplied to an external load (e.g., a household electrical appliance) via a power conditioner (e.g., an inverter), which is not shown.

The fuel gas that has not been consumed in the electric power generation by the fuel cell 12, i.e., an off fuel gas, is discharged through an off fuel gas passage 25. The upstream end of the off fuel gas passage 25 is connected to the fuel cell 12, and the downstream end of the off fuel gas passage 25 is connected to the exhaust outlet 17.

The oxidizing gas that has not been consumed in the electric power generation by the fuel cell 12, i.e., an off oxidizing gas, is discharged through an off oxidizing gas passage 26. The upstream end of the off oxidizing gas passage 26 is connected to the fuel cell 12, and the downstream end of the off oxidizing gas passage 26 is connected to the exhaust outlet 17.

Both the off fuel gas and the off oxidizing gas are discharged to the outside of the building 200 from the exhaust outlet 17 through the exhaust passage 19.

The air supply device 15 introduces air from the outside of the building 200 into the casing 11 to ventilate the inside of the casing 11. The air supply device 15 may be configured in any form, so long as the air supply device 15 is configured to adjust the amount of ventilation air. In Embodiment 1, a ventilation fan (a motor fan) serves as the air supply device 15. An exhaust operation using the ventilation fan 15 is performed via a ventilation passage 30, which connects the downstream end of the ventilation fan 15 to the exhaust outlet 17.

Ventilation by the operation of the ventilation fan 15 is performed in the following manner: the air outside the building is introduced from the air inlet 16 into the casing 11 through the supply passage 18; and the ventilation fan 15 causes the air inside the casing 11 to flow through the ventilation passage 30 such that the air is discharged from the exhaust outlet 17 to the outside of the building 200 through the exhaust passage 19.

The off fuel gas, the off oxidizing gas, and the ventilation air gather at the exhaust outlet, and are discharged to the outside of the building 200.

The temperature detector 20 detects the temperature of air that is introduced from the air inlet 16 into the casing 11 through the supply passage 18. In Embodiment 1, the temperature detector 20 is disposed inside the casing 11. This makes it possible to assuredly detect the temperature of the external air introduced into the casing. It should be noted that the position at which the temperature detector 20 is disposed is not limited to this example. Alternatively, the supply passage 18 or the exhaust passage 19 may be provided with the temperature detector 20. The temperature detector 20 serves to detect the temperature of air that has been introduced into the casing 11, and may be configured in any form. For example, the temperature detector 20 may be configured as a thermistor, thermocouple, or the like. Desirably, the temperature detector 20 is disposed near the air inlet 16 since the temperature detector 20 detects the temperature of air supplied from the outside of the building into the casing 11.

The controller 21 causes the air supply device 15 to operate, and thereafter, if the temperature detected by the temperature detector 20 is lower than or equal to a first predetermined temperature, the controller 21 reduces the amount of air supplied by the air supply device 15 and causes the air supply device 15 to continue operating. It should be noted that, in the present embodiment, the definition of the wording, "causes the air supply device 15 to continue operating", includes both causing the air supply device 15 to operate continuously and causing the air supply device 15 to operate intermittently.

The controller 21 may be configured as any device, so long as the device is configured to control component devices of the fuel cell system 100. The controller 21 includes an arithmetic processing unit, such as a microprocessor or a CPU, and a storage unit configured as, for example, a memory storing programs for executing control operations. Through the loading and execution, by the arithmetic processing unit, of a predetermined control program stored in the storage unit, the controller 21 performs various controls of the fuel cell system 100.

It should be noted that the controller 21 may be configured not only as a single controller, but as a group of multiple controllers that operate in cooperation with each other to control the fuel cell system 100. Moreover, the controller 21 may be configured as a microcomputer. Furthermore, the controller 21 may be configured as an MPU, PLC (Programmable Logic Controller), logic circuit, or the like.

Next, operations of the fuel cell system 100 according to Embodiment 1 are described with reference to FIG. 1 and FIG. 2. The present embodiment relates to operations of the fuel cell system 100, and particularly to initial operations that are performed at start-up of the fuel cell system 100.

Figure 2:
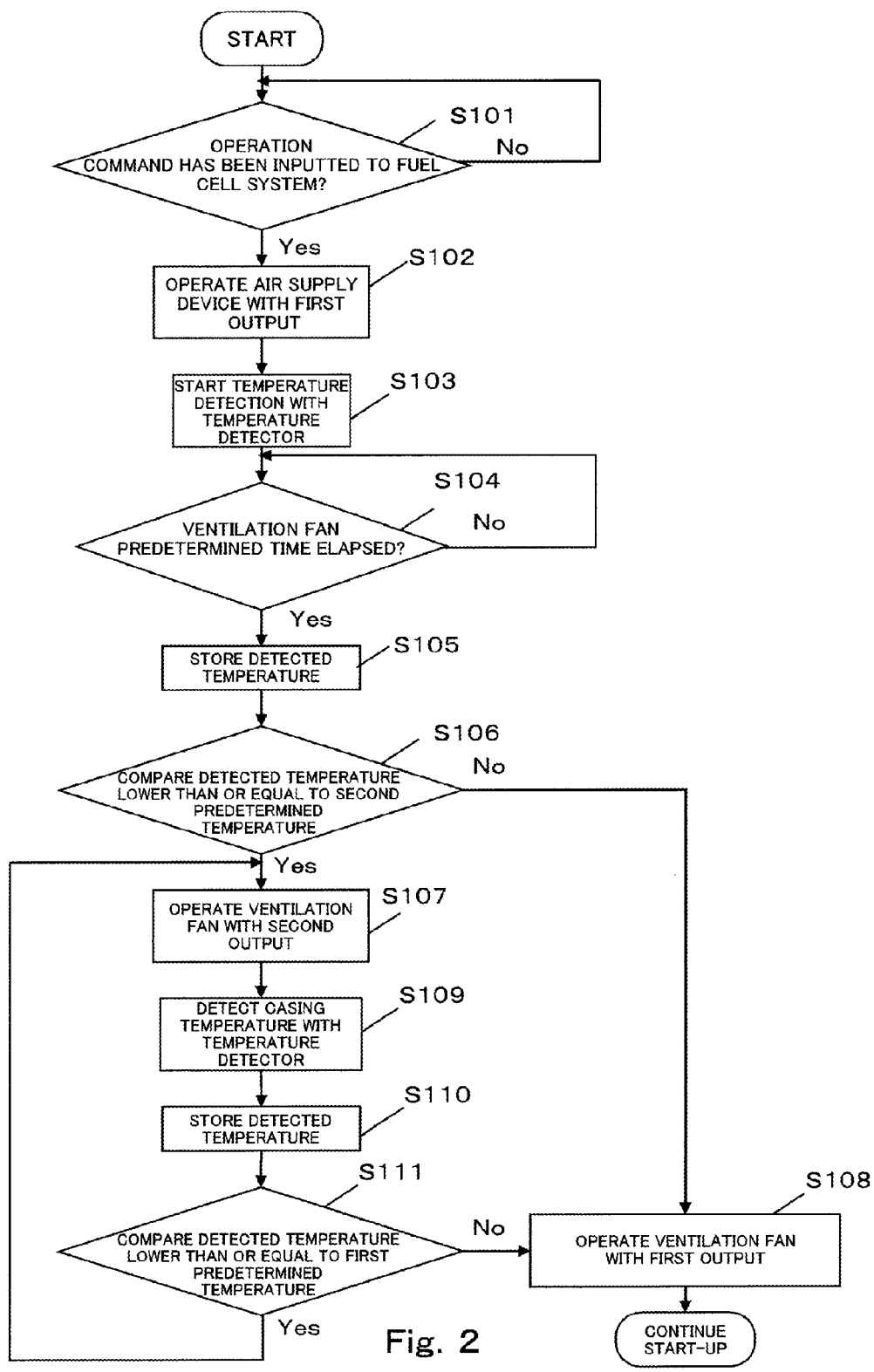
FIG. 2 is a flowchart schematically showing operations of the fuel cell system according to Embodiment 1.

FIG. 2 is a flowchart schematically showing operations of the fuel cell system 100 according to Embodiment 1.

As shown in FIG. 2, the controller 21 determines whether or not an operation command has been inputted to the fuel cell system 100 (step S101). Examples of a case where an operation command is inputted to the fuel cell system 100 include: a case where a user of the fuel cell system 100 has operated a remote controller, which is not shown, to cause the fuel cell system 100 to start operating; and a case where a preset operation start time has arrived.

If no operation command has been inputted to the fuel cell system 100 (No in step S101), the controller 21 repeats step S101 until an operation command is inputted.

If it is determined in step S101 that an operation command has been inputted to the fuel cell system 100 (Yes in step S101), the controller 21 proceeds to step S102.

In step S102, the controller 21 causes the air supply device (ventilation fan) 15 to start operating with a first output, and then proceeds to step S103. Here, the ventilation fan 15 is caused to operate first so that, after starting supplying a combustible gas, even if leakage of the combustible gas has occurred inside the casing 11, the combustible gas can be diluted and safely discharged from the casing 11 to the outside of the building 200.

In step S103, the controller 21 starts detecting the temperature of air that is introduced from the outside of the building 200, by means of the temperature detector 20, and then proceeds to step S104.

In step S104, the controller 21 determines whether or not the operating time of the ventilation fan 15 has reached a predetermined time, i.e., whether or not the predetermined time has elapsed.

If it is determined in step S104 that the operating time of the ventilation fan 15 has not reached the predetermined time yet (No in step S104), the controller 21 repeats step S104 until the predetermined time, specifically a first predetermined time, has elapsed.

If it is determined in step S104 that the operating time of the ventilation fan 15 has reached the predetermined time (Yes in step S104), the controller 21 proceeds to step S105. The first predetermined time in step S104 is a time that is necessary, when the ventilation fan 15 operates, for the air outside the building 200 to flow through the supply passage 18 and reach the inside of the casing 11. The first predetermined time is a value that is set based on, for example, the amount of air supplied by the ventilation fan 15 and the volume of the supply passage 18. Accordingly, after the system is started, the external air introduced into the casing is sufficiently warmed up by heat exchange. In this manner, a high freeze suppressing effect is provided. The first predetermined time herein is a time that is necessary, after the fuel cell system is started, for the temperature detected by the temperature detector 20 to become constant. The first predetermined time may be set in advance through a simulation, experiment, or the like. Although the predetermined time is used in Embodiment 1, a predetermined amount may be used instead of the predetermined time.

In step S105, the controller 21 stores the temperature detected by the temperature detector 20 when the predetermined time has elapsed, and then proceeds to step S106.

In step S106, the controller 21 compares the detected temperature stored in step S105 with a second predetermined temperature prestored in the controller 21.

If it is determined in step S106 that the detected temperature is higher than the second predetermined temperature (No in step S106), the controller 21 proceeds to step S108, in which the controller 21 causes the ventilation fan 15 to operate with the first output.

If it is determined in step S106 that the detected temperature is lower than or equal to the second predetermined temperature (Yes in step S106), the controller 21 proceeds to step S107, in which the controller 21 causes the ventilation fan 15 to operate with a second output, which is changed from the first output and which is less than the first output. Then, the controller 21 proceeds to step S109.

In step S109, the controller 21 detects the temperature inside the casing by means of the temperature detector 20.

In step S110, the controller 21 stores the detected temperature.

In step S111, the controller 21 compares the stored detected temperature with the first predetermined temperature, which is prestored in the controller 21. If it is determined in step S111 that the detected temperature is higher than the first predetermined temperature (No in step S111), the controller 21 proceeds to step S108, in which the controller 21 causes the ventilation fan 15 to operate with the first output. Then, the controller 21 continues the start-up.

If it is determined in step S111 that the detected temperature is lower than or equal to the first predetermined temperature (Yes in step S111), the flow returns to step S107.

Causing the ventilation fan 15 to operate with the second output, which is changed from the first output and which is less than the first output, means reducing the output to such an air supply amount as not to cause freezing in the casing 11 and causing the ventilation fan 15 to continue operating with the reduced output. The second output may be, for example, a flow rate that is set based on a prestored relationship between the second predetermined temperature and the air supply amount.

As described above, when the fuel cell system 100 according to Embodiment 1 starts operating, first, the ventilation fan 15 is operated with the first output for the first predetermined time to cause the external air to reach the inside of the casing 11. Then, the temperature detected by the temperature detector 20 is compared with the second predetermined temperature. If the detected temperature is lower than or equal to the second predetermined temperature, the output of the ventilation fan 15 is changed from the first output to the second output less than the first output, and the ventilation fan 15 is caused to continue operating with the reduced air supply amount. In this manner, the cooling of the inside of the casing 11 is suppressed, and thereby freezing can be prevented.

Further, the detected temperature, which is the temperature inside the casing detected by the temperature detector 20, is compared with the first predetermined temperature. If the detected temperature is higher than the first predetermined temperature, it is determined that the current condition does not cause freezing. Accordingly, the output of the ventilation fan 15 is brought back to the first output, and the operation can be continued with the first output.

In Embodiment 1, after causing the ventilation fan 15 to operate for the predetermined time, if the temperature detected by the temperature detector 20 is lower than or equal to the first predetermined temperature, the controller 21 reduces the amount of air supplied by the ventilation fan 15 and causes the ventilation fan 15 to continue operating with the reduced air supply amount. However, the present embodiment is not thus limited. Alternatively, after causing the ventilation fan 15 to operate for the predetermined time, if the temperature detected by the temperature detector 20 is within a predetermined temperature range and lower than or equal to the first predetermined temperature, the controller 21 may reduce the amount of air supplied by the ventilation fan 15 and cause the ventilation fan 15 to continue operating with the reduced air supply amount. According to such a configuration, after the system is started, the external air introduced into the casing is sufficiently warmed up by heat exchange, and the temperature of the introduced external air is stabilized. As a result, the freeze suppressing effect is improved.

In Embodiment 1, a ventilation fan is used as the air supply device. However, in the case of a fuel cell system that requires no ventilation fan, an oxidizing gas supply device may be used as the air supply device. In this case, since the oxidizing gas supply device serving as the air supply device can introduce the external air into the casing, the same advantageous effect can be obtained.

Although Embodiment 1 includes one temperature detector 20, which is disposed inside the casing, the present embodiment is not thus limited. An alternative configuration including two temperature detectors may be adopted, in which: a temperature detector is provided outdoors, the temperature detector detecting the first predetermined temperature, which is the temperature of the external air introduced into the casing; and in addition, a temperature detector detecting the second predetermined temperature, which is the temperature inside the casing, is disposed such that at least one of the inside of the casing, the supply passage, and the exhaust passage is provided with the temperature detector.

(Variation 1)

Figure 3:
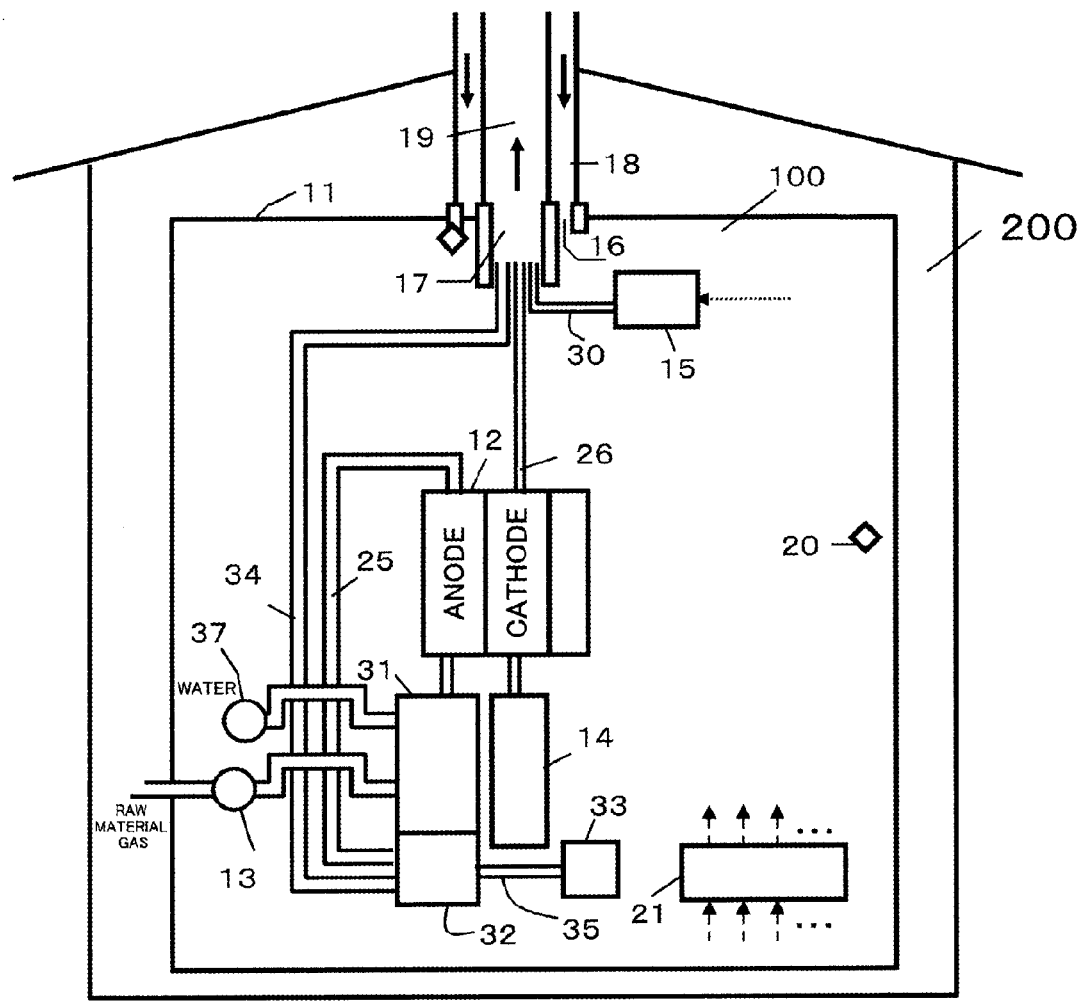
FIG. 3 is a schematic diagram showing a schematic configuration of a fuel cell system according to a variation of Embodiment 1 of the present invention.

Hereinafter, the configuration of a fuel cell system according to a variation of Embodiment 1 of the present invention is described with reference to the drawings. FIG. 3 is a schematic diagram showing a schematic configuration of the fuel cell system according to the variation of Embodiment 1 of the present invention.

As shown in FIG. 3, the fuel cell system 100 according to the variation of Embodiment 1 includes: a fuel generator 31 configured to reform a raw material gas to generate a fuel gas to be supplied to the fuel cell 12; a combustor 32 configured to combust the raw material gas or off fuel gas; and a combustion air supply device 33 configured to supply air to the combustor 32.

The fuel gas supply device 13 and a water supply device 37 are connected to the fuel generator 31, and thereby the raw material and steam are supplied to the fuel generator 31. For example, natural gas containing methane as a main component, or LP gas, may be used as the raw material.

The fuel generator 31 includes a reforming catalyst. For example, any substance capable of catalyzing a steam reforming reaction through which to generate a hydrogen-containing gas from the raw material and steam may be used as the reforming catalyst. Examples of the reforming catalyst include a ruthenium-based catalyst in which a catalyst carrier such as alumina carries ruthenium and a nickel-based catalyst in which a catalyst carrier such as alumina carries nickel.

In the fuel generator 31, the fuel gas, which contains hydrogen as a main component, is generated through a reforming reaction between the supplied raw material and steam. The generated fuel gas is supplied to the fuel cell 12.

The combustor 32 is configured to combust the raw material or off fuel gas, and heat the fuel generator 31 with the resulting combustion heat. The off fuel gas passage 25 is connected to the combustor 32. The upstream end of the off fuel gas passage 25 is connected to the fuel cell 12, and the downstream end of the off fuel gas passage 25 is connected to the combustor 32. The combustion air supply device 33, whose air supply output is less than that of the ventilation fan 15 (air supply device), is in communication with the combustor 32 via a combustion air passage 35. The upstream end of the combustion air passage 35 is connected to the combustion air supply device 33, and the downstream end of the combustion air passage 35 is connected to the combustor 32.

The combustion air supply device 33 may be configured in any form, so long as the combustion air supply device 33 is configured to supply air for use in combustion to the combustor 32. For example, the combustion air supply device 33 may be constituted by a fan device, such as a fan or a blower, and a diaphragm pump. In Variation 1, a combustion fan that is a motor fan is used as the combustion air supply device 33.

Further, a flue gas passage 34, through which a flue gas flows, is connected to the combustor 32. The upstream end of the flue gas passage 34 is connected to the combustor 32, and the downstream end of the flue gas passage 34 is connected to the exhaust outlet 17. The flue gas passage 34 is provided with a heat exchanger (not shown), and heat is recovered from the flue gas through an exhaust heat recovery passage (not shown).

Next, operations performed in Variation 1 are described with reference to FIG. 3 and FIG. 4.

Figure 4:
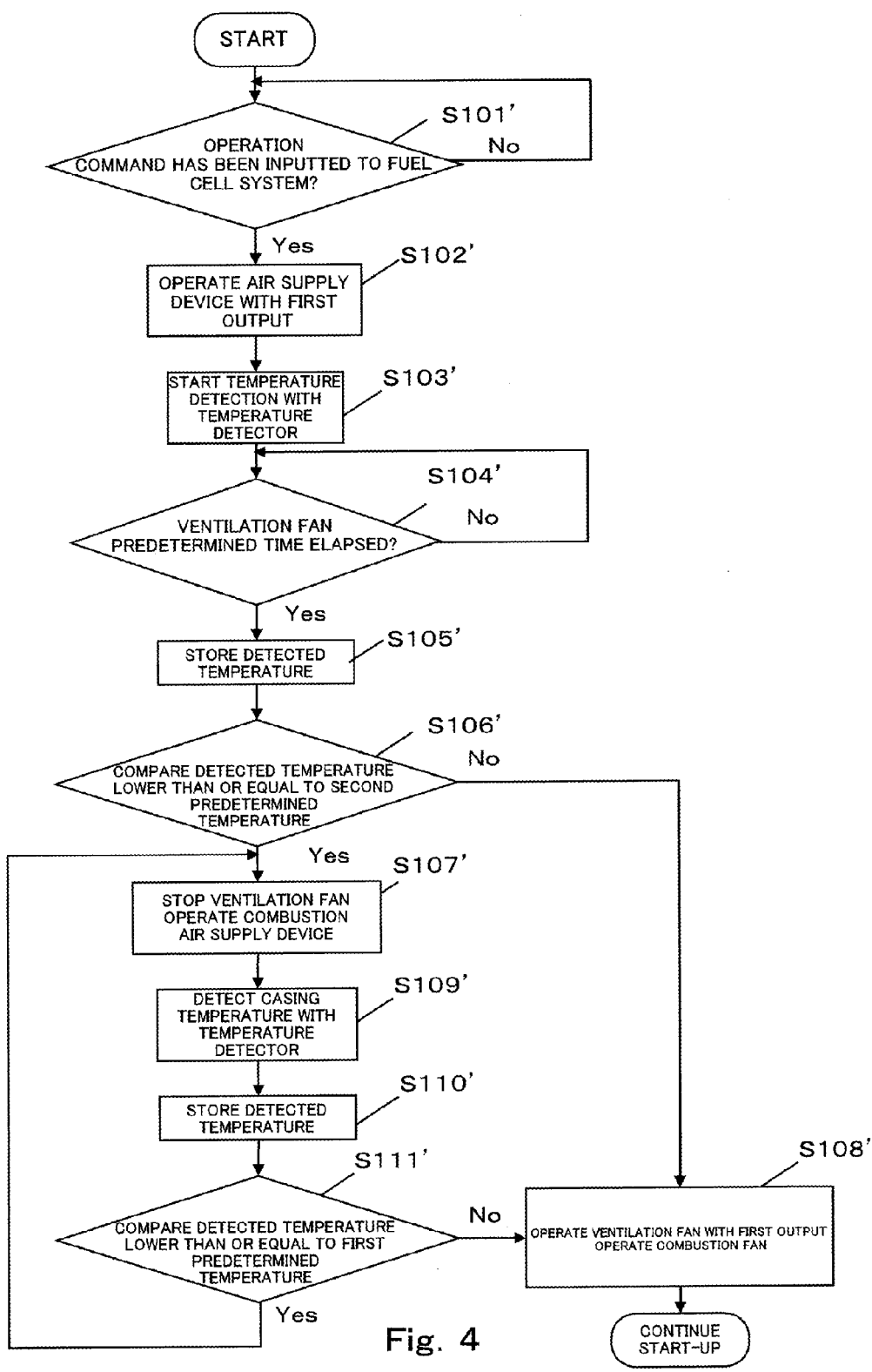
FIG. 4 is a flowchart schematically showing operations of the fuel cell system according to the variation of Embodiment 1.

FIG. 4 is a flowchart schematically showing operations of the fuel cell system 100 according to Variation 1.

Steps S101' to S105' shown in FIG. 4 are the same as steps S101 to S105 of Embodiment 1 shown in FIG. 2. Therefore, the description of steps S101' to S105' is omitted. Hereinafter, the operations from step S106' are described.

In step S106', the controller 21 compares the detected temperature stored in step S105' with the second predetermined temperature prestored in the controller 21.

If it is determined in step S106' that the stored detected temperature is higher than the second predetermined temperature (No in step S106'), the controller 21 proceeds to step S108', in which the controller 21 causes the ventilation fan 15, which is the air supply device, to operate with the first output, and causes the combustion air supply device 33 to operate. Then, the controller 21 continues the start-up.

If it is determined in step S106' that the detected temperature is lower than or equal to the second predetermined temperature (Yes in step S106'), the controller 21 proceeds to step S107', in which the controller 21 stops the ventilation fan 15, and causes the combustion air supply device 33, the output of which is less than that of the ventilation fan 15, to operate. Then, the controller 21 proceeds to the next step.

In step S109', the controller 21 detects the temperature inside the casing by means of the temperature detector 20.

In step S110', the controller 21 stores the detected temperature.

In step S111', the controller 21 compares the stored detected temperature with the first predetermined temperature prestored in the controller 21. If it is determined in step S111' that the measured temperature is higher than the first predetermined temperature (No in step S111'), the controller 21 proceeds to step S108, in which the controller 21 causes the ventilation fan 15 to operate with the first output, and causes the combustion air supply device 33 to operate. Then, the controller 21 continues the start-up.

If it is determined in step S111' that the measured temperature is lower than or equal to the first predetermined temperature (Yes in step S111'), the flow returns to step S107'.

As described above, when the fuel cell system 100 according to the variation of Embodiment 1 starts operating, first, the ventilation fan 15 is operated for the first predetermined time to cause the external air to reach the inside of the casing 11. Then, the temperature detected by the temperature detector 20 is compared with the second predetermined temperature. If the detected temperature is lower than or equal to the second predetermined temperature, the ventilation fan 15 is stopped, and the combustion air supply device 33, the output of which is less than that of the ventilation fan 15, is caused to operate to reduce the amount of air supplied into the casing 11. In this manner, the cooling of the inside of the casing 11 is suppressed, and thereby freezing can be prevented.

According to Variation 1, in a case where the temperature of the introduced external air is low to a greater degree, the combustion air supply device 33 is caused to operate, and the combustor 32 is caused to perform combustion. As a result, in the heat exchange between the exhaust passage 19 and the supply passage 18, the flue gas warms up the external air introduced into the casing 11. Since the ventilation fan 15 merely discharges air from the inside of the casing 11, the temperature of the air that is discharged by the ventilation fan 15 through the exhaust passage 19 is low. Therefore, the flue gas, which is obtained as a result of operating the combustion air supply device 33, provides a better freeze suppressing effect in the fuel cell system 100 than the exhaust gas sent from the ventilation fan 15. The freeze suppressing effect is particularly high in a case where the amount of air supplied by the ventilation fan is greater than the amount of air supplied by the combustion air supply device. Therefore, the configuration as in Variation 1, in which the amount of air supplied by the ventilation fan 15 is greater than the amount of air supplied by the combustion air supply device 33, is desirable.

Figure 5:
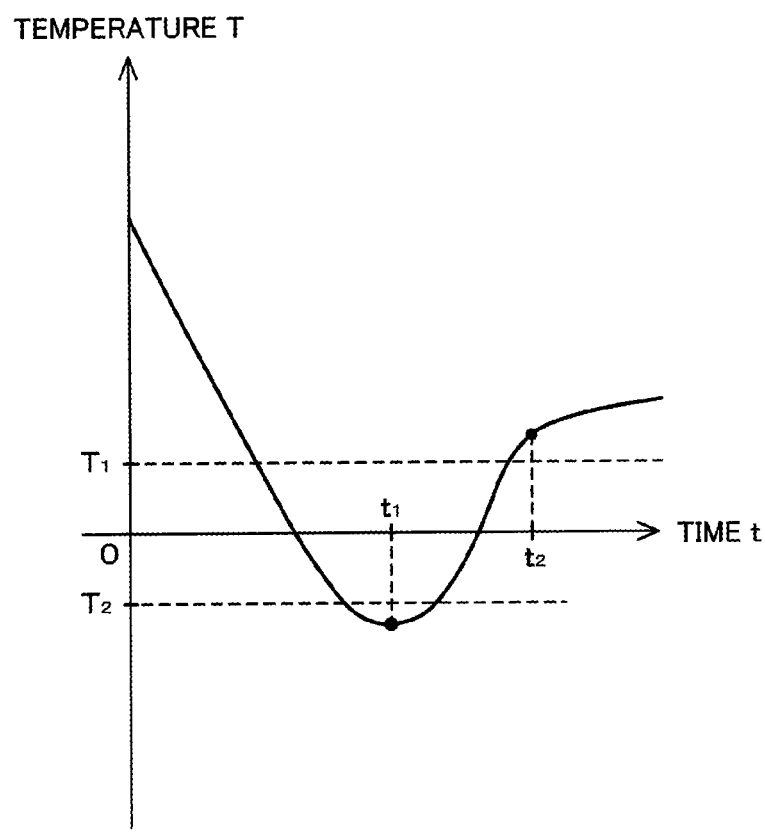
FIG. 5 is a graph schematically showing temporal changes in the temperature inside the casing of the fuel cell system according to the variation of Embodiment 1.

FIG. 5 is a graph schematically showing temporal changes in the detected temperature T inside the casing of the fuel cell system 100 according to Variation 1 of the present embodiment. As shown in FIG. 5, immediately after the system is started, cold external air is introduced into the casing 11 by the ventilation fan 15, and the temperature inside the casing decreases, accordingly. After the first predetermined time $t_1$ has elapsed, if the temperature is lower than the second predetermined temperature $T_2$, the ventilation fan 15 is stopped, and the combustion air supply device 33 is caused to operate. After the time $t_1$ has elapsed, the flue gas from the combustor 32 is discharged through the exhaust passage 19, and thereby the temperature inside the casing increases. Thereafter, when the temperature has become higher than or equal to the first predetermined temperature $T_1$, the ventilation fan 15 is caused to resume operating (time $t_2$).

Embodiment 2

First, the configuration of a fuel cell system according to Embodiment 2 of the present invention is described.

Hereinafter, the configuration of the fuel cell system according to Embodiment 2 of the present invention is described with reference to FIG. 6. The fuel cell system according to Embodiment 2 includes a cooling water passage 29 through which cooling water cooling down the fuel cell 12 flows, a first water circulator 28, and a cooling water tank 27. The fuel cell system 100 is configured such that, while the fuel cell system 100 is in operation (during electric power generation), the first water circulator 28 is caused to operate to recover heat generated by the fuel cell 12 by means of a heating medium (water). The first water circulator 28 may be configured in any form, so long as the first water circulator 28 is configured to circulate the cooling water while adjusting the flow rate of the cooling water. For example, the first water circulator 28 may be configured as a pump device, such as a rotary pump or cylinder pump.

The off fuel gas passage 25 is provided with a first heat exchanger 41, and the off oxidizing gas passage 26 is provided with a second heat exchanger 42. An exhaust heat recovery passage 43 leads to the first heat exchanger 41 and the second heat exchanger 42. Low-temperature water flows from a hot water storage tank to the exhaust heat recovery passage 43. The water flows through the first heat exchanger 41 and the second heat exchanger 42 to recover heat from the off fuel gas and the off oxidizing gas. As a result, the water becomes hot water, and returns to the tank. The hot water stored in the tank is utilized for hot water supply or heating, used in a bathroom, etc.

Figure 6:
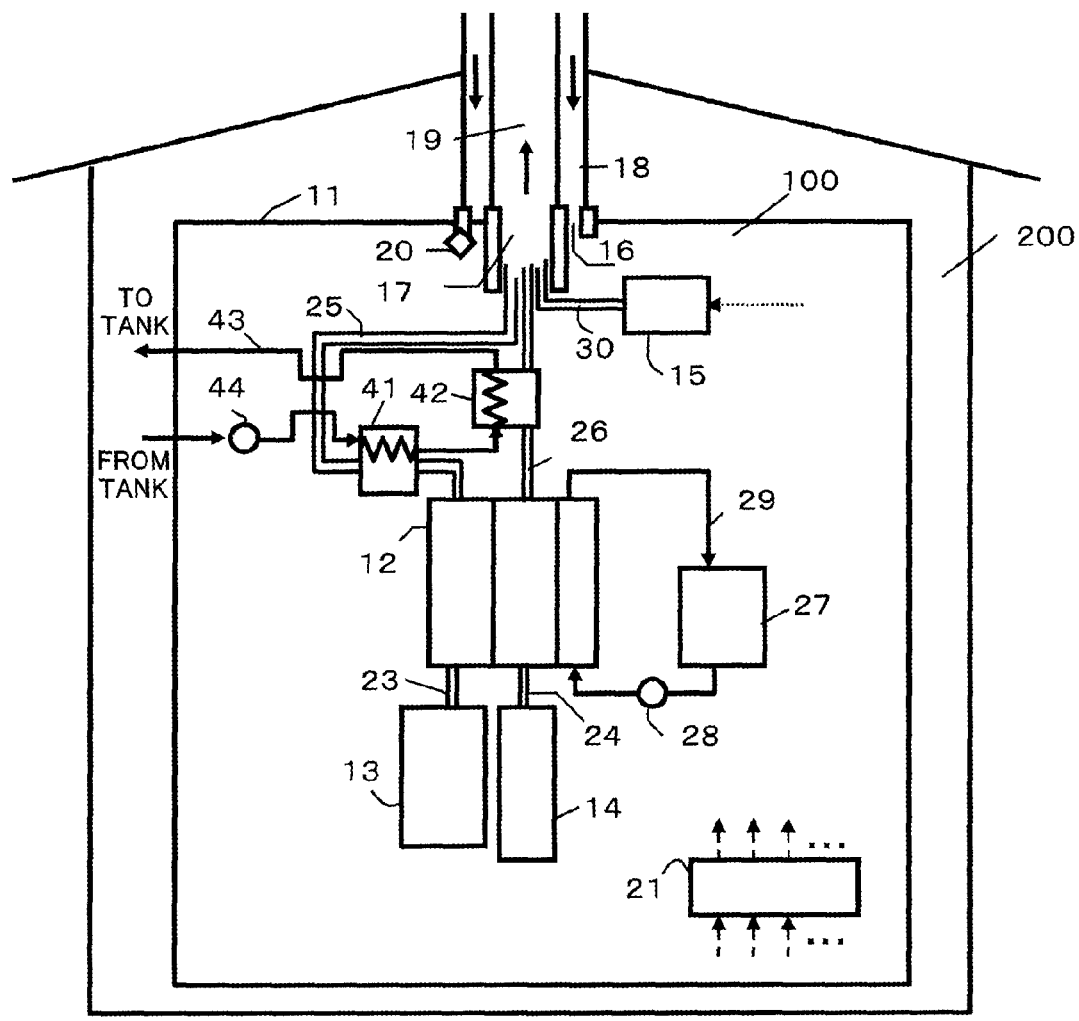
FIG. 6 is a schematic diagram showing a schematic configuration of a fuel cell system according to Embodiment 2 of the present invention.

Alternatively, a heat exchanger may be provided in the cooling water passage 29, which may be configured to lead to the exhaust heat recovery passage 43 although such a configuration is not shown in FIG. 6.

The fuel cell system 100 is configured such that, while the fuel cell system 100 is in operation (during start-up and electric power generation), a second water circulator 44 is caused to operate to recover heat from the off fuel gas and the off oxidizing gas by means of a heating medium (water). The second water circulator 44 may be configured in any manner, so long as the second water circulator 44 is configured to circulate water that recovers heat. For example, the second water circulator 44 may be configured as a pump device, such as a rotary pump or cylinder pump.

Other than the above features, the configuration according to Embodiment 2 is the same as the configuration according to Embodiment 1. Therefore, no further detailed description of the configuration according to Embodiment 2 is given below.

Next, operations according to Embodiment 2 are described with reference to FIG. 7.

Figure 7:
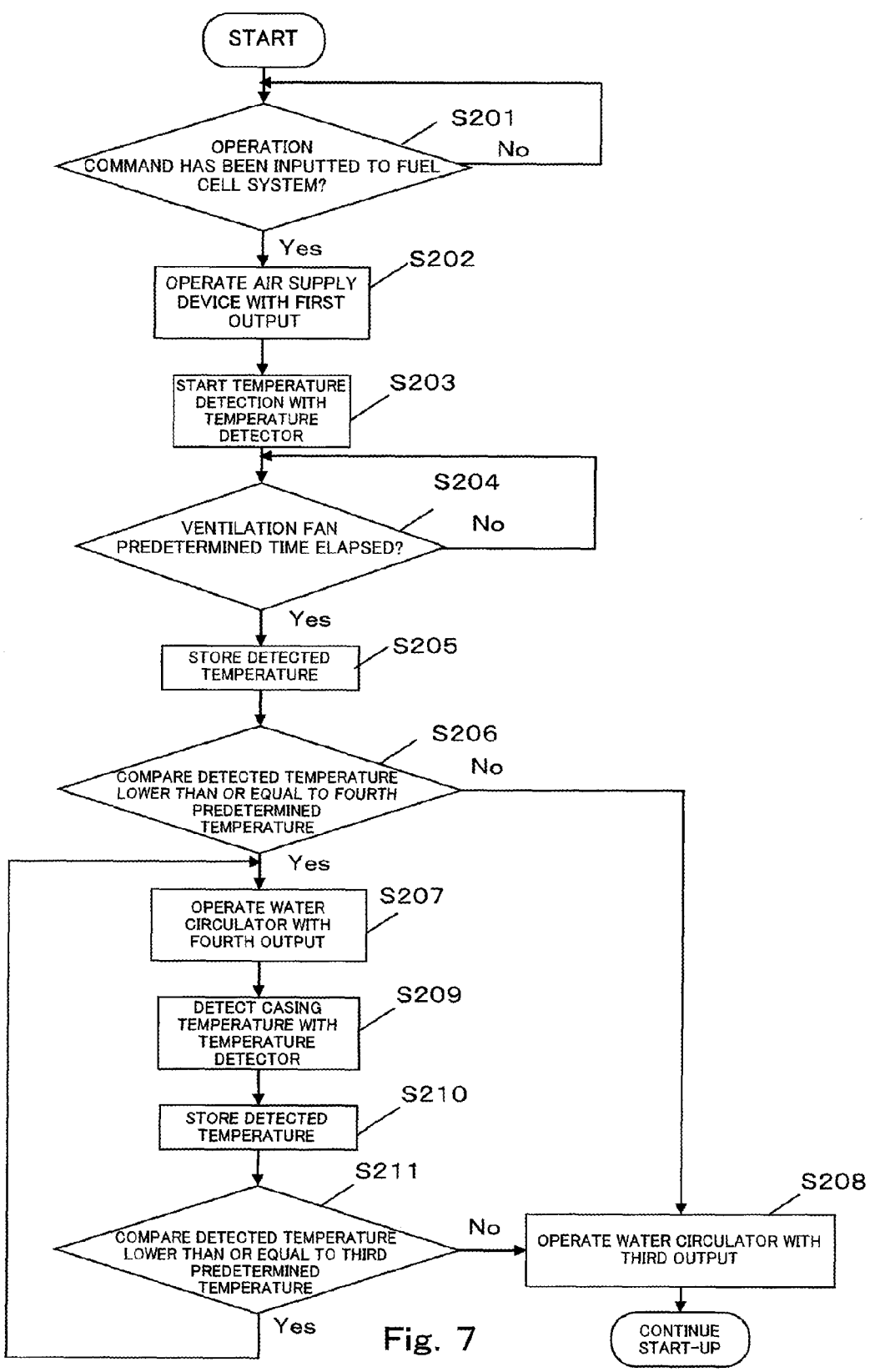
FIG. 7 is a flowchart schematically showing operations of the fuel cell system according to Embodiment 2.

FIG. 7 is a flowchart schematically showing operations of the fuel cell system 100 according to Embodiment 2.

Steps S201 to S205 shown in FIG. 7 are the same as steps S101 to S105 of Embodiment 1. Therefore, the description of steps S201 to S205 is omitted. Hereinafter, the operations from step S206 are described.

If it is determined in step S206 that the measured temperature is higher than a fourth predetermined temperature (No in step S206), the controller 21 proceeds to step S208, in which the controller 21 causes the first water circulator 28 and the second water circulator 44 to operate with a third output. Then, the controller 21 proceeds to the next step and continues the start-up.

If it is determined in step S206 that the detected temperature is lower than or equal to the fourth predetermined temperature (Yes in step S206), the controller 21 proceeds to step S207, in which the controller 21 causes both the first water circulator 28 and the second water circulator 44 to operate with a fourth output. Then, the controller 21 proceeds to the next step S209.

In step S209, the controller 21 detects the temperature inside the casing by means of the temperature detector 20.

In step S210, the controller 21 stores the detected temperature.

In step S211, the controller 21 compares the stored detected temperature with a third predetermined temperature prestored in the controller 21. If it is determined in step S211 that the detected temperature is higher than the third predetermined temperature (No in step S211), the controller 21 proceeds to step S208, in which the controller 21 causes the first water circulator 28 and the second water circulator 44 to operate with the third output. Then, the controller 21 proceeds to the next step and continues the start-up.

If it is determined in step S211 that the detected temperature is lower than or equal to the third predetermined temperature (Yes in step S211), the flow returns to step S207.

Here, the third output of the water circulators is an output indicative of a stopped state of the water circulators, or is an output for obtaining a water circulation amount when the fuel cell system is in a normal state. The fourth output of the water circulators is an output for obtaining a water circulation amount for avoiding transient freezing.

As described above, when the fuel cell system 100 according to Embodiment 2 starts operating, first, the ventilation fan 15 is operated to cause the external air to reach the inside of the casing 11. Then, the temperature detected by the temperature detector 20 is compared with the fourth predetermined temperature. If the detected temperature is lower than or equal to the fourth predetermined temperature, the first water circulator 28 and the second water circulator 44 are caused to operate with the fourth output, and thereby water is flowed through the cooling water passage 29 and the exhaust heat recovery passage 43. By causing the water circulators to operate in this manner, the freezing of the water passages can be prevented when the temperature is such that only the adjustment of the amount of air supplied by the ventilation fan 15 is not enough to avoid the freezing.

Although in Embodiment 2 the fuel cell system includes both the cooling water passage and the heat recovery passage, the fuel cell system may have an alternative configuration that includes one of the cooling water passage and the heat recovery passage.

In Embodiment 2, in step S207, both the first water circulator 28 and the second water circulator 44 are caused to operate at the same time. However, the present embodiment is not thus limited. As an alternative, one of the first water circulator and the second water circulator may be caused to operate in step S207.

Further, the third output may be such that each of the first water circulator 28 and the second water circulator 44 has a unique third output.

Still further, the third output may be changed in accordance with the temperature detected by the temperature detector 20.

Embodiment 3

Next, Embodiment 3 is described with reference to FIG. 8 and FIG. 9.

Figure 8:
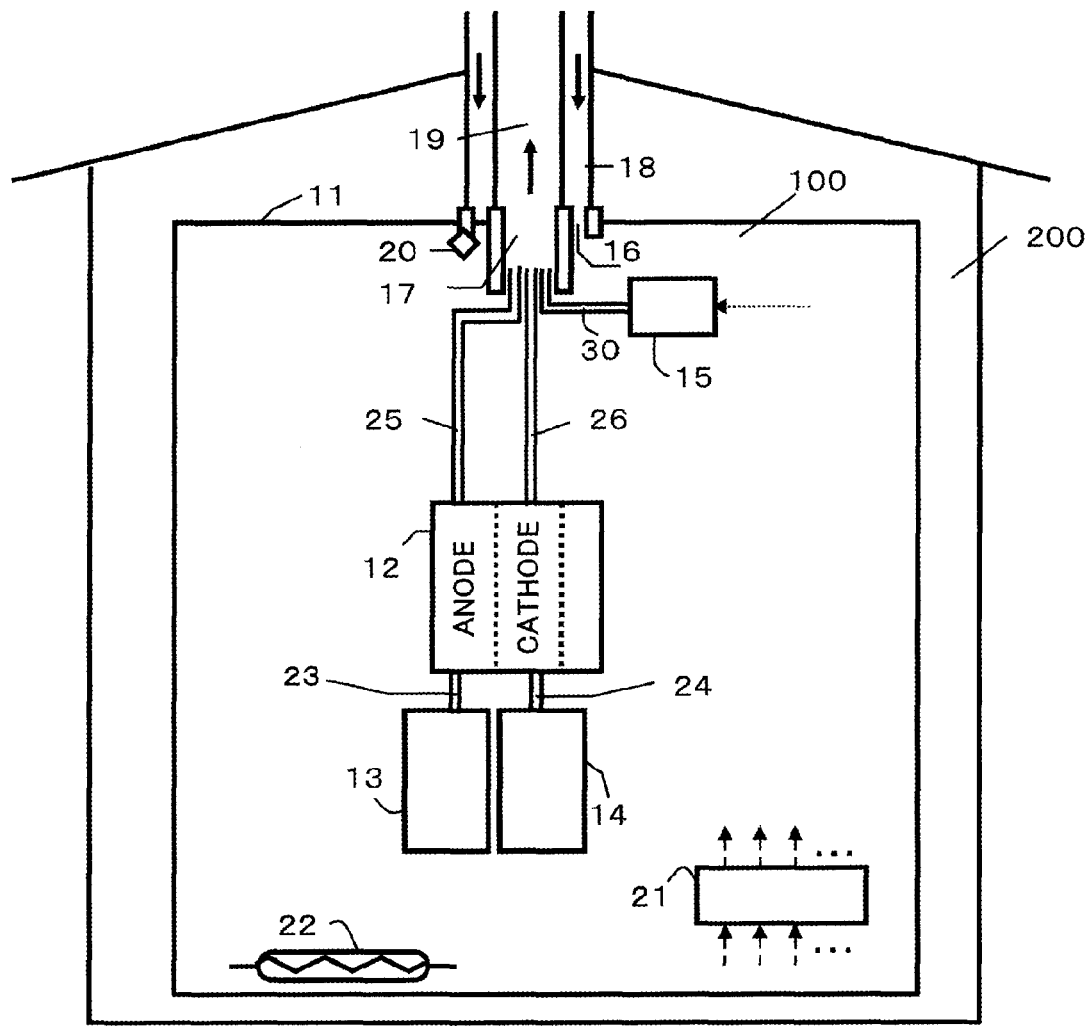
FIG. 8 is a schematic diagram showing a schematic configuration of a fuel cell system according to Embodiment 3 of the present invention.

FIG. 8 is a schematic diagram showing a schematic configuration of a fuel cell system according to Embodiment 3 of the present invention.

As shown in FIG. 8, the fuel cell system according to Embodiment 3 includes a heating device 22. The heating device 22 is a heater configured to warm up the inside of the casing 11. The heating device 22 may be configured in any form. The heating device 22 may be configured as a ceramic heater, a sheathed heater, or a rubber heater, for example. Other than the heating device 22, the configuration according to Embodiment 3 is the same as the configuration according to Embodiment 1. Therefore, no further detailed description of the configuration according to Embodiment 3 is given below.

Figure 9:
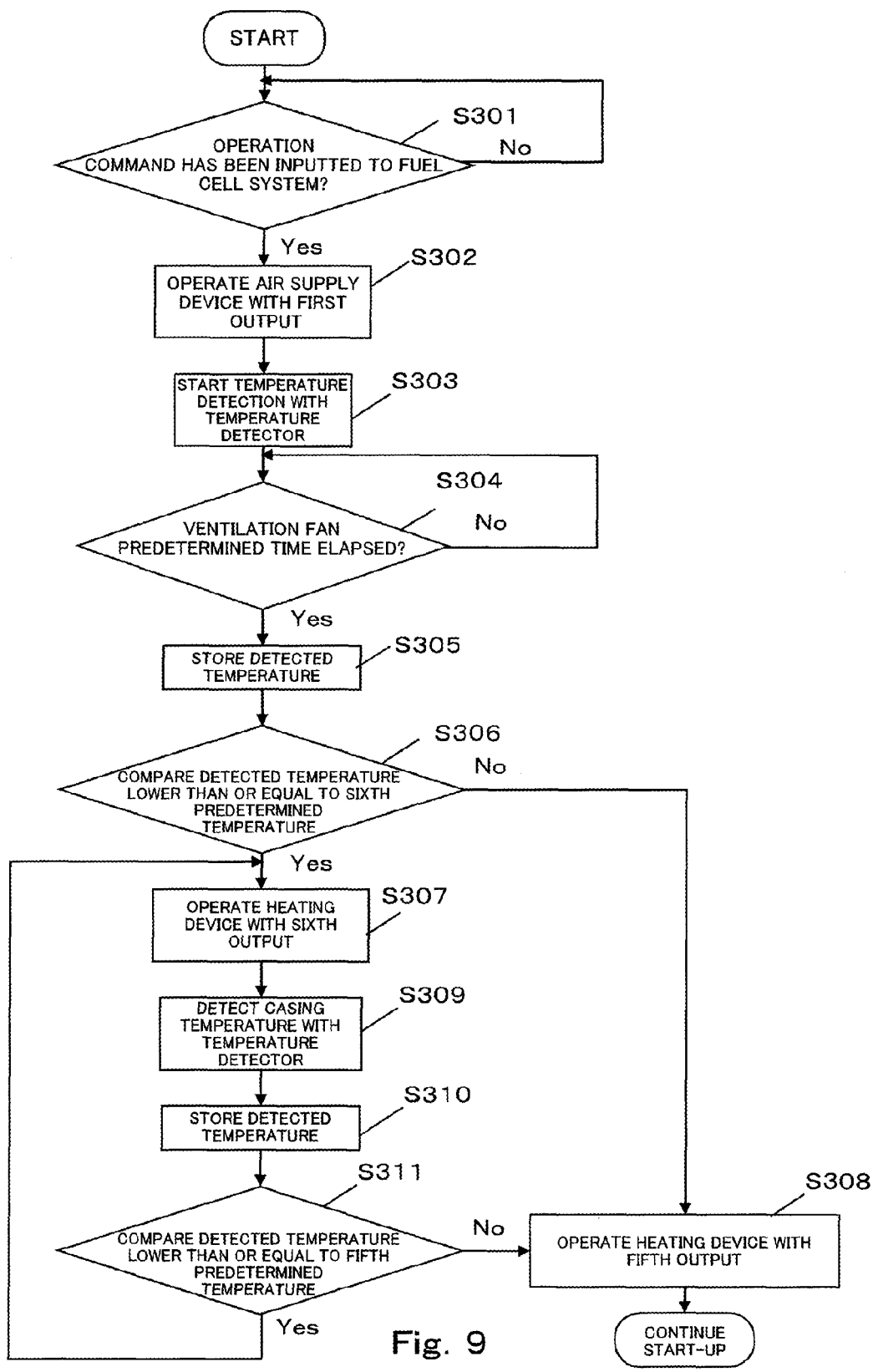
FIG. 9 is a flowchart schematically showing operations of the fuel cell system according to Embodiment 3.

FIG. 9 is a flowchart schematically showing operations of the fuel cell system 100 according to Embodiment 3.

Steps S301 to S305 shown in FIG. 9 are the same as steps S101 to S105 of Embodiment 1. Therefore, the description of steps S301 to S305 is omitted. Hereinafter, the operations from step S306 are described.

If it is determined in step S306 that the detected temperature is higher than a sixth predetermined temperature (No in step S306), the controller 21 proceeds to step S308, in which the controller 21 causes the heating device 22 to operate with a fifth output (i.e., to be in a stopped state (OFF)). Then, the controller 21 proceeds to the next step and continues the start-up.

If it is determined in step S306 that the detected temperature is lower than or equal to the sixth predetermined temperature (Yes in step S306), the controller 21 proceeds to step S307, in which the controller 21 causes the heating device 22 to operate with a sixth output (i.e., to start up (ON)). Then, the controller 21 proceeds to the next step S309.

In step S309, the controller 21 detects the temperature inside the casing by means of the temperature detector 20.

In step S310, the controller 21 stores the detected temperature.

In step S311, the controller 21 compares the stored detected temperature with a fifth predetermined temperature prestored in the controller 21. If it is determined in step S311 that the detected temperature is higher than the fifth predetermined temperature (No in step S111'), the controller 21 proceeds to step S308, in which the controller 21 causes the heating device 22 to operate with the fifth output (i.e., to be in a stopped state (OFF)). Then, the controller 21 proceeds to the next step and continues the start-up.

If it is determined in step 211 that the detected temperature is lower than or equal to the fifth predetermined temperature (Yes in step S311), the flow returns to step S307.

As described above, when the fuel cell system 100 according to Embodiment 3 starts operating, first, the ventilation fan 15 is operated to cause the external air to reach the inside of the casing 11. Then, the temperature detected by the temperature detector 20 is compared with the sixth predetermined temperature. If the detected temperature is lower than or equal to the sixth predetermined temperature, the heating device 22 is caused to operate with the sixth output to warm up the inside of the casing 11. In this manner, the freezing of the inside of the casing 11 can be prevented.

Although in Embodiment 3 the sixth output of the heating device 22 is an output indicative of a started state (ON) of the heating device 22, the output of the heating device 22 may be changed in accordance with the temperature detected by the temperature detector 20.

Embodiment 4

First, the configuration of a fuel cell system according to Embodiment 4 of the present invention is described. The configuration of the fuel cell system according to Embodiment 4 is the same as the configuration according to Embodiment 1, which is shown in FIG. 1. Therefore, a detailed description of the configuration of the fuel cell system according to Embodiment 4 is omitted.

Next, operations according to Embodiment 4 are described with reference to FIG. 1 and FIG. 10.

Figure 10:
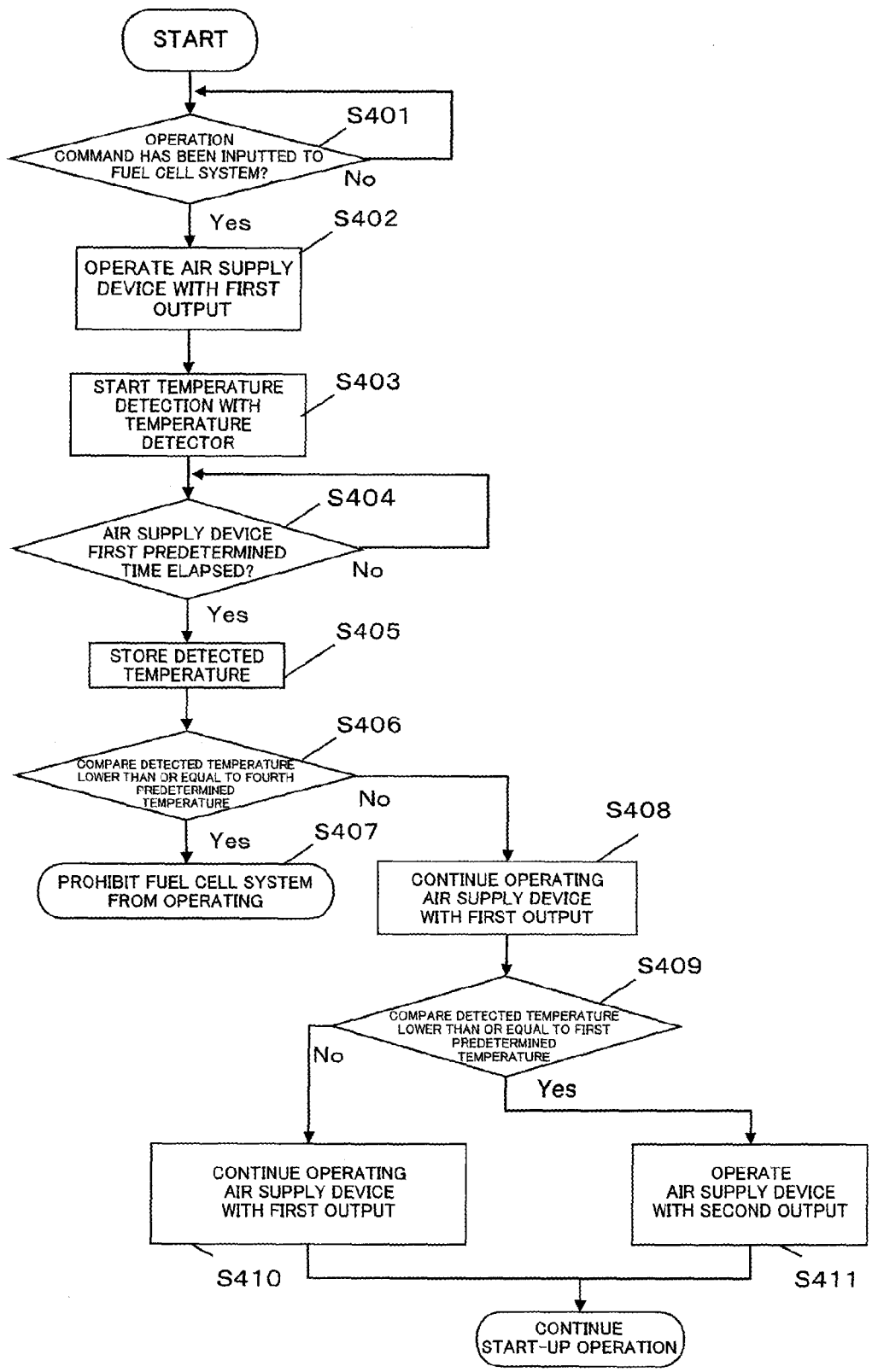
FIG. 10 is a flowchart schematically showing operations of a fuel cell system according to Embodiment 4.

FIG. 10 is a flowchart schematically showing operations of the fuel cell system 100 according to Embodiment 4.

Steps S401 to S405 shown in FIG. 10 are the same as steps S101 to S105 of Embodiment 1 shown in FIG. 2. Therefore, the description of steps S401 to S405 is omitted. Hereinafter, the operations from step S406 are described.

In step S406, the controller 21 compares the detected temperature stored in step S405 with the fourth predetermined temperature.

If it is determined in step S406 that the detected temperature is lower than or equal to the fourth predetermined temperature (Yes in step S406), the controller 21 proceeds to step S407, in which the controller 21 prohibits the fuel cell system from operating.

The fourth predetermined temperature herein is −20° C. or lower, which is a temperature at which freezing is likely to occur inside the casing 11. However, the fourth predetermined temperature is not limited to −20° C. or lower.

If it is determined in step S406 that the detected temperature is higher than the fourth predetermined temperature (No in step S406), the controller 21 proceeds to step S408, in which the controller 21 causes the air supply device to continue operating with the first output. Then, the controller 21 proceeds to step S409.

In step S409, the controller 21 compares the detected temperature stored in step S405 with the prestored first predetermined temperature.

If it is determined in step S409 that the detected temperature is higher than the first predetermined temperature (No in step S409), the controller 21 proceeds to step S411, in which the controller 21 causes the ventilation fan 15 to continue operating with the first output. Then, the controller 21 proceeds to the next step, in which the controller 21 continues the start-up operation.

If it is determined in step S409 that the detected temperature is lower than or equal to the first predetermined temperature (Yes in step S409), the controller 21 proceeds to step S410, in which the controller 21 causes the ventilation fan 15 to operate with the second output. Then, the controller 21 proceeds to the next step, in which the controller 21 continues the start-up operation.

As described above, when the fuel cell system 100 according to Embodiment 4 starts operating, first, the air supply device 15 is operated to cause the external air to reach the inside of the casing 11. Then, the temperature detected by the temperature detector 20 is compared with the fourth predetermined temperature. If the detected temperature is lower than or equal to the fourth predetermined temperature, which is a temperature at which freezing is difficult to avoid, the fuel cell system is prohibited from operating so that the external air will not be taken into the casing. In this manner, freezing can be avoided.

Embodiment 5

Next, a fuel cell system according to Embodiment 5 of the present invention is described.

Figure 11:
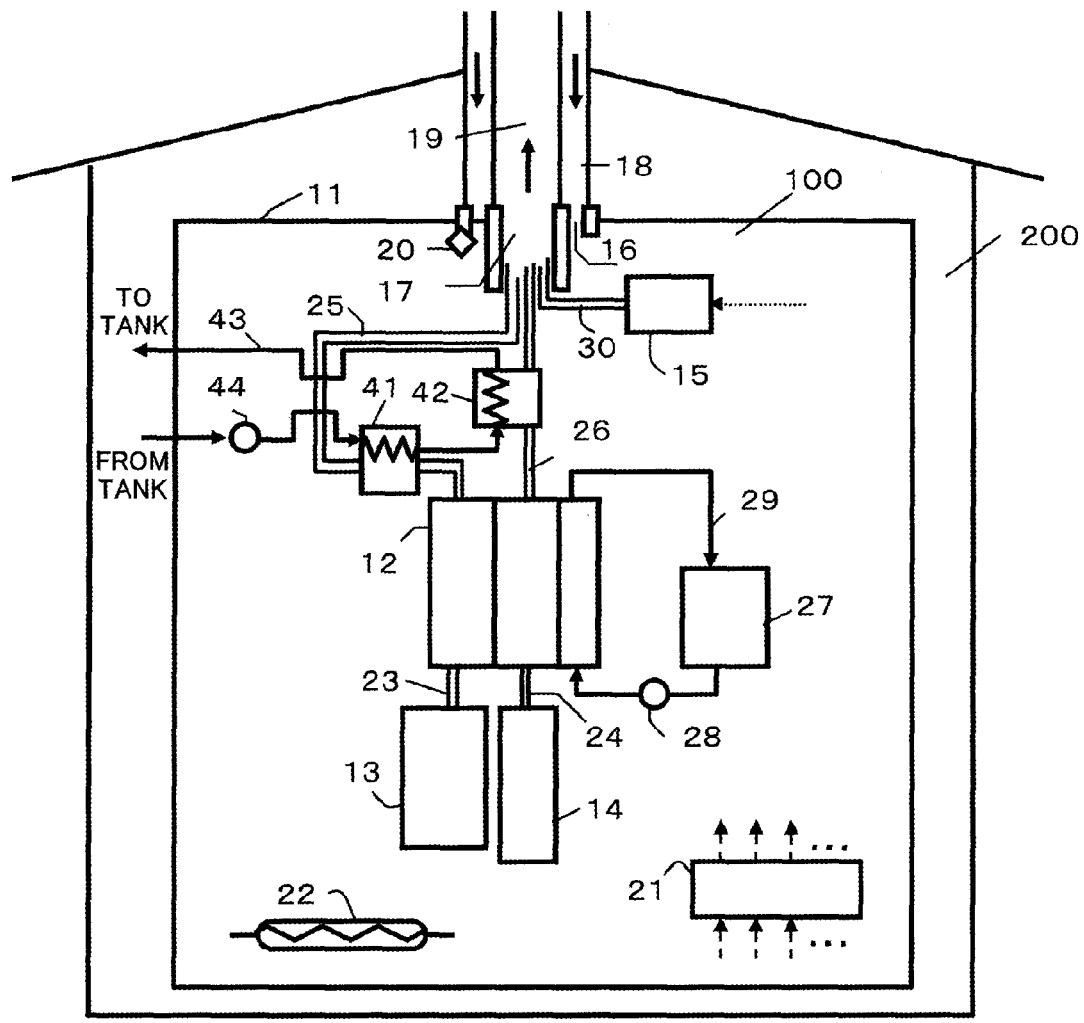
FIG. 11 is a schematic diagram showing a schematic configuration of a fuel cell system according to Embodiment 5.

FIG. 11 is a schematic diagram showing a schematic configuration of the fuel cell system according to Embodiment 5. As shown in FIG. 11, the fuel cell system according to Embodiment 5 includes the air supply device 15, the heating device 22, the first water circulator 28, and the second water circulator 44.

Next, operations according to Embodiment 5 are described with reference to FIG. 11 and FIG. 12.

Figure 12:
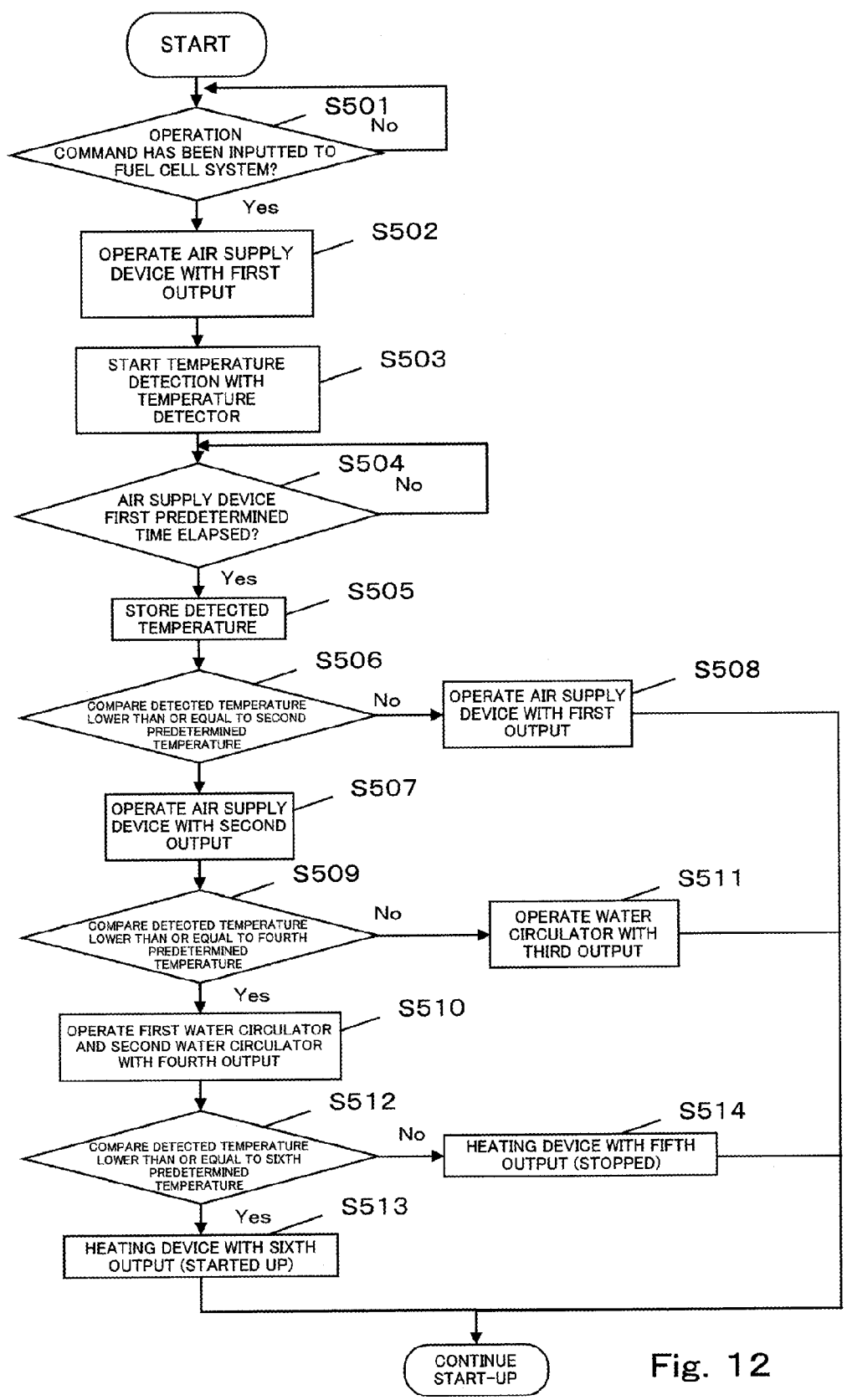
FIG. 12 is a flowchart schematically showing operations of the fuel cell system according to Embodiment 5.

FIG. 12 is a flowchart schematically showing operations of the fuel cell system 100 according to Embodiment 5.

As shown in FIG. 12, the controller 21 determines whether or not an operation command has been inputted to the fuel cell system 100 (step S501).

If no operation command has been inputted to the fuel cell system 100 (No in step S501), the controller 21 repeats step S501 until an operation command is inputted.

If it is determined in step S501 that an operation command has been inputted to the fuel cell system 100 (Yes in step S501), the controller 21 proceeds to step S502.

In step S502, the controller 21 causes the ventilation fan 15 to start operating with the first output, and proceeds to step S503.

In step S503, the controller 21 starts detecting the temperature of air that is introduced from the outside of the building 200, by means of the temperature detector 20, and then proceeds to step S504.

In step S504, the controller 21 determines whether or not the operating time of the ventilation fan 15 has reached the predetermined time, i.e., whether or not the predetermined time has elapsed.

If it is determined in step S504 that the operating time of the ventilation fan 15 has not reached the predetermined time yet (No in step S504), the controller 21 repeats step S504 until the predetermined time, specifically the first predetermined time, has elapsed.

If it is determined in step S504 that the operating time of the ventilation fan 15 has reached the predetermined time (Yes in step S504), the controller 21 proceeds to step S505.

In step S505, the controller 21 stores the temperature detected by the temperature detector 20 when the predetermined time has elapsed, and then proceeds to step S506.

In step S506, the controller 21 compares the detected temperature stored in step S505 with the second predetermined temperature prestored in the controller 21.

If it is determined in step S506 that the detected temperature is higher than the second predetermined temperature (No in step S506), the controller 21 proceeds to step S508, in which the controller 21 causes the ventilation fan 15 to continue operating with the first output. Then, the controller 21 continues the start-up.

If it is determined in step S506 that the detected temperature is lower than or equal to the second predetermined temperature (Yes in step S506), the controller 21 proceeds to step S507, in which the controller 21 changes the output of the ventilation fan 15 into the second output. Then, the controller 21 proceeds to step S509.

In step S509, the controller 21 compares the detected temperature stored in step S505 with the fourth predetermined temperature.

If it is determined in step S509 that the detected temperature is lower than or equal to the fourth predetermined temperature (Yes in step S509), the controller 21 proceeds to step S510, in which the controller 21 causes the first water circulator 28 and the second water circulator 44 to operate with the fourth output. Then, the controller 21 proceeds to step S512.

If it is determined in step S509 that the detected temperature is higher than the fourth predetermined temperature (No in step S509), the controller 21 proceeds to step S511, in which the controller 21 causes the first water circulator 28 and the second water circulator 44 to operate with the third output. Then, the controller 21 continues the start-up.

In step S512, the controller 21 compares the detected temperature stored in step S505 with the sixth predetermined temperature.

If it is determined in step S512 that the detected temperature is lower than or equal to the sixth predetermined temperature (Yes in step S512), the controller 21 proceeds to step S513, in which the controller 21 causes the heating device to operate with the sixth output (i.e., to start). Then, the controller 21 continues the start-up.

If it is determined in step S512 that the detected temperature is higher than the sixth predetermined temperature (No in step S512), the controller 21 proceeds to step S511, in which the controller 21 causes the heating device to operate with the fifth output (i.e., to stop). Then, the controller 21 continues the start-up.

In Embodiment 5, the relationship among the first predetermined temperature, the second predetermined temperature, and the third predetermined temperature is as follows: the first predetermined temperature>the second predetermined temperature>the third predetermined temperature. That is, the temperatures are set such that the first predetermined temperature is higher than the second predetermined temperature, and the second predetermined temperature is higher than the third predetermined temperature.

The third predetermined temperature may be set to 0° C. as a temperature at which to start a freezing avoidance operation by utilizing heating. The second predetermined temperature may be set to 3° C. as a temperature at which to start a freezing avoidance operation by utilizing water circulation. The first predetermined temperature may be set to 5° C. as a temperature at which to start a freezing avoidance operation by reducing the air supply amount.

As described above, when the fuel cell system 100 according to Embodiment 5 starts operating, first, the air supply device 15 is operated to cause the external air to reach the inside of the casing 11. Then, in accordance with the temperature detected by the temperature detector 20, a necessary accessory device operation for avoiding the freezing can be selected. Therefore, in addition to the advantageous effects described in Embodiments 1 to 5, the following advantageous effect can be obtained: by performing different freezing avoidance operations corresponding to respective levels of the detected temperature, the energy consumption of the accessory device can be controlled.

Embodiments 1 to 5 have given descriptions regarding the operations performed at the start-up of the fuel cell system. However, the embodiments are not thus limited. These embodiments also include the following case: when the detected temperature has continued to be the first predetermined temperature, third predetermined temperature, or fifth predetermined temperature during start-up, the operation shifts from the start-up to electric power generation; and after the electric power generation has started, the temperature inside the casing increases and the second temperature, fourth temperature, or sixth temperature has been measured.

INDUSTRIAL APPLICABILITY

The fuel cell system and the method of operating the same according to the present invention are capable of stable electric power generation by the fuel cell system and make it possible to improve the durability of the fuel cell system. Therefore, the fuel cell system and the method of operating the same according to the present invention are useful in the fields of fuel cells.

REFERENCE SIGNS LIST 11 casing
12 fuel cell
13 fuel gas supply device
14 oxidizing gas supply device
15 air supply device (ventilation fan)
16 air inlet
17 exhaust outlet
18 supply passage
19 exhaust passage
20 temperature detector
21 controller
22 heating device
23 fuel gas supply passage
24 oxidizing gas supply passage
25 off fuel gas passage
26 off oxidizing gas passage
27 cooling water tank
28 first water circulator
29 cooling water passage
30 ventilation passage
31 fuel generator
32 combustor
33 combustion air supply device
34 flue gas passage
35 combustion air passage
41 first heat exchanger
42 second heat exchanger
43 exhaust heat recovery passage
44 second water circulator
100 fuel cell system
200 building

The invention claimed is:

1. A fuel cell system comprising:
a fuel cell configured to generate electric power by causing a fuel gas and an oxidizing gas to react with each other;
a reformer configured to generate the fuel gas by reforming a raw material, and supply the fuel gas to the fuel cell;
a combustor configured to combust a combustible gas to heat the reformer;
a casing accommodating at least the fuel cell, the casing including an air inlet and an exhaust outlet formed therein;
a supply passage connected to the air inlet, the supply passage being configured to introduce external air into the casing from outside of the casing;
an exhaust passage connected to the exhaust outlet, the exhaust passage being configured to exchange heat with the supply passage and discharge at least air inside the casing to the outside of the casing, the exhaust passage being in communication with the combustor in such a manner as to discharge a flue gas from the combustor;

an air supply device configured to introduce the external air into the casing through the supply passage, the air supply device including a ventilator configure to ventilate the air inside the casing and a combustion air supply device configured to supply combustion air to the combustor;

a temperature detector disposed such that at least one of the inside of the casing, the supply passage, and the exhaust passage is provided with the temperature detector, the temperature detector being configured to detect a temperature; and a controller programmed to control at least the air supply device, wherein if the temperature detected by the temperature detector after the controller has caused the air supply device to operate is lower than or equal to a second predetermined temperature, which is lower than a first predetermined temperature, the controller stops the ventilator from operating, causes the combustion air supply device to operate, and causes the combustor to perform combustion.

2. The fuel cell system according to claim 1, wherein the temperature detector is disposed inside the casing, and if the temperature detected by the temperature detector after the controller has caused the air supply device to operate and the external air has been introduced into the casing through the supply passage is lower than or equal to the first predetermined temperature, the controller reduces the amount of air supplied by the air supply device and causes the air supply device to continue operating.

3. The fuel cell system according to claim 1, wherein if the temperature detected by the temperature detector after the controller has caused the air supply device to operate for a first predetermined time is lower than or equal to the first predetermined temperature, the controller reduces the amount of air supplied by the air supply device and causes the air supply device to continue operating.

4. The fuel cell system according to claim 1, wherein if the temperature detected by the temperature detector after the controller has caused the air supply device to operate for a second predetermined time is in a predetermined temperature range and lower than or equal to the first predetermined temperature, the controller reduces the amount of air supplied by the air supply device and causes the air supply device to continue operating.

5. The fuel cell system according to claim 1, wherein the air supply device includes the ventilator configured to ventilate the air inside the casing, an oxidizing gas supply device configured to supply air serving as the oxidizing gas to the fuel cell, and the combustion air supply device configured to supply combustion air to the combustor.

6. The fuel cell system according to claim 1, further comprising:

at least one of a cooling water passage and a heat recovery passage, the cooling water passage being a passage through which cooling water circulates, the cooling water absorbing heat that is generated when the fuel cell generates electric power, the heat recovery passage being a passage through which heat recovery water circulates, the heat recovery water exchanging heat with an off fuel gas and an off oxidizing gas, the off fuel gas being the fuel gas that is discharged from the fuel cell, the off oxidizing gas being the oxidizing gas that is discharged from the fuel cell; and a water circulator disposed in the at least one of the cooling water passage and the heat recovery passage, wherein if the temperature detected by the temperature detector after the controller has caused the air supply device to operate is lower than or equal to a third predetermined temperature, which is lower than the first predetermined temperature, the controller increases an amount of water circulated by the water circulator as compared to a case where the temperature detected by the temperature detector after the controller has caused the air supply device to operate is higher than the third predetermined temperature.

7. The fuel cell system according to claim 1, further comprising a heating device disposed inside the casing, wherein if the temperature detected by the temperature detector after the controller has caused the air supply device to operate is lower than or equal to a fourth predetermined temperature, which is lower than a third predetermined temperature, the controller increases an amount of heating by the heating device as compared to a case where the temperature detected by the temperature detector after the controller has caused the air supply device to operate is higher than the fourth predetermined temperature.

8. The fuel cell system according to claim 1, wherein if the temperature detected by the temperature detector after the controller has caused the air supply device to operate is lower than or equal to a fifth predetermined temperature, which is lower than a fourth predetermined temperature, the controller prohibits start-up of the fuel cell system, or stops the fuel cell system from operating.

9. A method of operating a fuel cell system, the fuel cell system including:

a fuel cell configured to generate electric power by causing a fuel gas and an oxidizing gas to react with each other;

a reformer configured to generate the fuel gas by reforming a raw material, and supply the fuel gas to the fuel cell;

a combustor configured to combust a combustible gas to heat the reformer;

a casing accommodating at least the fuel cell, the casing including an air inlet and an exhaust outlet formed therein;

a supply passage connected to the air inlet, the supply passage being configured to introduce external air into the casing from outside of the casing;

an exhaust passage connected to the exhaust outlet, the exhaust passage being configured to exchange heat with the supply passage and discharge at least air inside the casing to the outside of the casing, the exhaust passage being in communication with the combustor in such a manner as to discharge a flue gas from the combustor;

an air supply device configured to introduce the external air into the casing through the supply passage, the air supply device including a ventilator configured to ventilate the air inside the casing and a combustion air supply device configured to supply combustion air to the combustor;

a temperature detector disposed such that at least one of the inside of the casing, the supply passage, and the exhaust passage is provided with the temperature detector, the temperature detector being configured to detect a temperature; and a controller programmed to control at least the air supply device, the method comprising:

if the temperature detected by the temperature detector after the controller has caused the air supply device to operate is lower than or equal to a second predetermined temperature, which is lower than a first predetermined temperature, via the controller, stopping the ventilator from operating, causing the combustion air supply device to operate, and causing the combustor to perform combustion.

* * * * *